(12) United States Patent
Matsuda

(10) Patent No.: US 8,427,455 B2
(45) Date of Patent: Apr. 23, 2013

(54) IMAGE PROCESSING APPARATUS AND IMAGE PROCESSING METHOD

(75) Inventor: Kouichi Matsuda, Tokyo (JP)

(73) Assignee: Sony Corporation (JP)

( * ) Notice: Subject to any disclaimer, the term of this patent is extended or adjusted under 35 U.S.C. 154(b) by 929 days.

(21) Appl. No.: 11/429,483

(22) Filed: May 5, 2006

(65) Prior Publication Data

US 2006/0265731 A1    Nov. 23, 2006

(30) Foreign Application Priority Data

May 17, 2005    (JP) .................. 2005-143644

(51) Int. Cl.
 G06F 3/038    (2006.01)
 G09G 5/00    (2006.01)

(52) U.S. Cl.
 USPC ............. 345/204; 725/37; 725/100; 725/131; 348/E5.099; 348/E5.105

(58) Field of Classification Search .................. 345/204; 715/700
 See application file for complete search history.

(56) References Cited

U.S. PATENT DOCUMENTS

| 6,603,866 | B1 | 8/2003 | Motono et al. | |
| 7,387,250 | B2* | 6/2008 | Muni | 235/462.01 |
| 2003/0074671 | A1* | 4/2003 | Murakami et al. | 725/109 |
| 2004/0133072 | A1* | 7/2004 | Kennedy | 600/109 |
| 2004/0262393 | A1* | 12/2004 | Hara et al. | 235/462.14 |

FOREIGN PATENT DOCUMENTS

| EP | 1 511 302 | | 3/2005 |
| JP | 9-044932 | A | 2/1997 |
| JP | 10-164524 | A | 6/1998 |
| JP | 10-164525 | A | 6/1998 |
| JP | 2000-341630 | A | 12/2000 |
| JP | 2000341630 | A * | 12/2000 |
| JP | 2002-185906 | A | 6/2002 |
| JP | 2002-320164 | A | 10/2002 |
| WO | WO-00/10327 | | 2/2000 |
| WO | WO 0010327 | A * | 2/2000 |

OTHER PUBLICATIONS

Extended European Search Report, EP 06 25 2490, Dated Aug. 31, 2006.
Adobe Systems Incorporated: "Adobe Photoshop Album 2.0—Product Overview", 2004, URL: http://www.adobe.com/products/photoshopalbum/pdfs/photoshopalbum_overview.pdf>.

* cited by examiner

*Primary Examiner* — Kevin M Nguyen
*Assistant Examiner* — Kenneth B Lee, Jr.
(74) *Attorney, Agent, or Firm* — Lerner, David, Littenberg, Krumholz & Mentlik, LLP

(57) ABSTRACT

An image processing apparatus includes image data capturing means for capturing a frame of stream image data displayed on a display device in accordance with an input capturing instruction, additional data generating means for generating additional data to be associated with the image data captured by the image data capturing means, and storage control means for storing into a predetermined storage unit the image data captured by the image data capturing means and the additional data generated by the additional data generating means in association with each other.

17 Claims, 20 Drawing Sheets

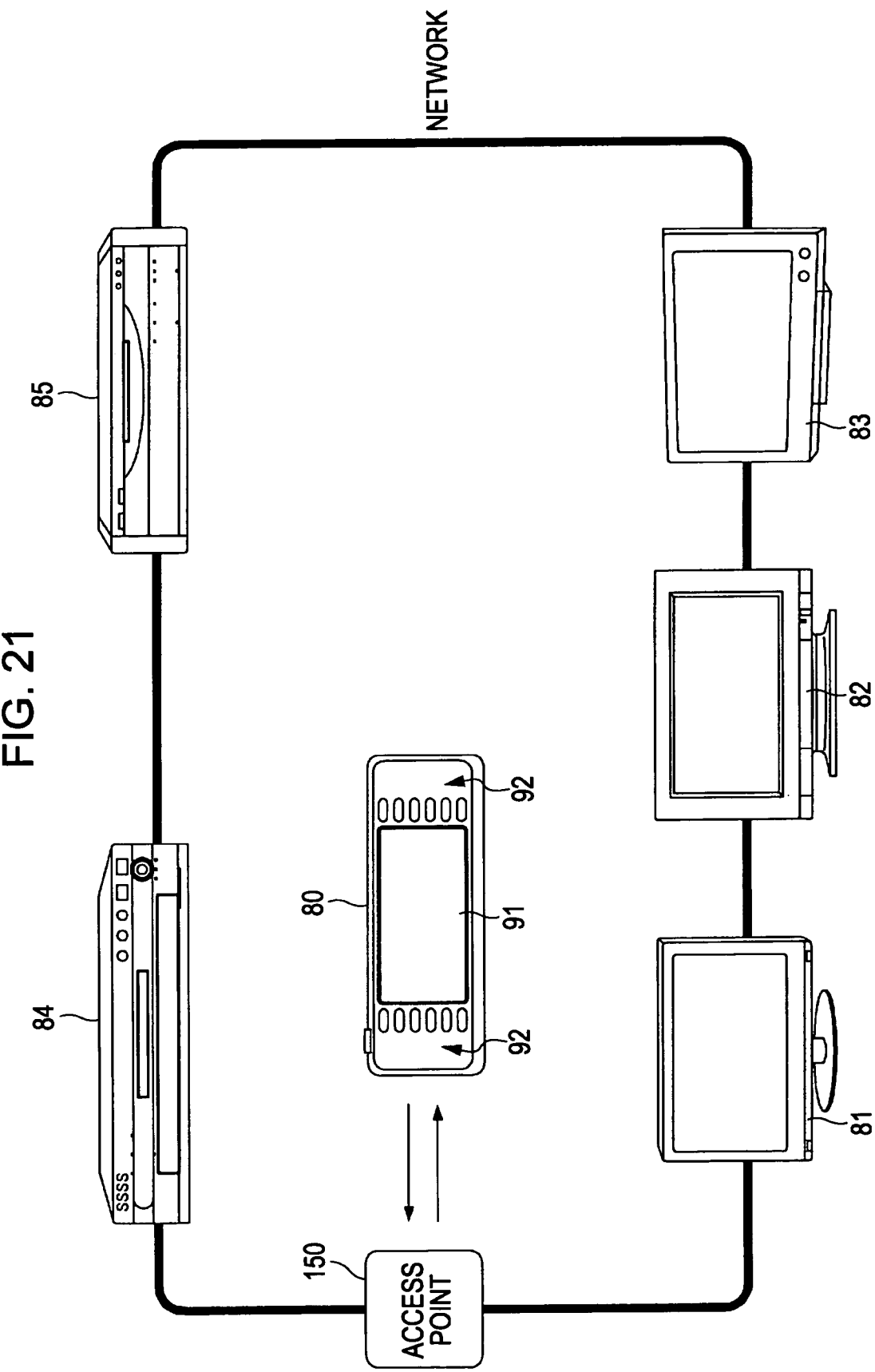

IMAGE PROCESSING APPARATUS AND IMAGE PROCESSING METHOD

CROSS-REFERENCE TO RELATED APPLICATIONS

The present application claims priority from Japanese Patent Application No. JP 2005-143644 filed on May 17, 2005, the disclosure of which is hereby incorporated by reference herein.

BACKGROUND OF THE INVENTION

The present invention relates to image processing apparatuses and image processing methods that process reception images, such as television broadcasts, and playback images.

Nowadays, various types of information is transmitted via stream data, such as broadcast waves, and viewed in real time or recorded using a recorder, such as a video recorder, to be played back and viewed.

In particular, television broadcast programs often provide information desired by viewers in various program formats. For example, information on towns, information on sightseeing spots and spas, information on shops in various fields, information on events, information on goods, and other information is presented in programs. For the sake of explanation, such programs are referred to as "information programs".

Viewers are able to acquire information presented in programs by viewing information programs that are television broadcasted in real time or by playing back and viewing information programs recorded on a video recorder.

Known technologies are described, for example, in Japanese Unexamined Patent Application Publication Nos. 10-164525, 10-164524, and 9-44932.

SUMMARY OF THE INVENTION

The above-mentioned information programs have advantages in providing viewers with information in detail and in an understandable way using moving images and sound. For example, an information program featuring Chinese noodle restaurants effectively provides information desired by viewers, such as the exterior and interior appearances of the restaurants, food, comments by performers, and interviews with restaurant staff.

For example, when a viewer wants to remember information provided in such an information program, the viewer records the program on a video recorder. Alternatively, if a pre-recorded program is played back, the viewer preserves the recorded content. In other words, if a program is recorded and stored, the viewer is able to check desired information when necessary.

All the stream data (moving images as broadcast content) provided in information programs is not necessarily stored, unlike drama programs. In other words, in many cases, information that a viewer wants to store after viewing an information program or information that the user wants to check later is only part of the broadcasted content. For example, for the above-mentioned program featuring Chinese noodle restaurants, the viewer only wants to acquire the names, appearance, and addresses of the restaurants.

Thus, if the entire information program is stored, compared with the amount of information desired by the viewer, an enormous amount of information is stored. Therefore, it is difficult for the viewer to find desired information.

In other words, the storage capacity of a video recorder may be insufficient for storing moving images as an information program. In addition, in order to acquire broadcasted information, the viewer searches for desired information by playing back the recorded program content. Thus, the viewer spends time and efforts.

A list of desired information is not available. For example, a list of information on Chinese noodle restaurants presented in a program featuring Chinese noodle restaurants is not available.

In order to make it easier to handle or capture and store the above-mentioned information included in stream data, such as a broadcast program, a viewer records the information on another medium, such as paper, a computer, or a personal digital assistant (PDA), or as a picture, while viewing a displayed image.

Such methods require appropriate preparation before recording corresponding information. In addition, when the viewer is viewing a real-time broadcast program, the viewer does not have enough time for appropriate preparation. For example, preparing paper and writing implements is required for storing information on paper, turning on the power of a computer to start an editor and to enter a state in which characters can be input is required for storing information on the computer, and turning on the power of a camera to enter a state in which photographing can be performed is required for storing information as a picture.

In addition, when information provided as stream data is recorded as character information on paper, a computer, or the like, image information that is useful as information is missing. For example, image information on the appearance of a Chinese noodle restaurant is missing.

Although image information can be stored by photographing a display screen with a camera and recording the photographed display screen as a picture (static image data), a viewer spends time and efforts and feels difficult to carefully perform photographing such that a photographed image makes sense as information. For example, sufficient attention and technology is required for photographing the display screen in the right position.

Thus, it is difficult for a user to store information provided as stream data, such as information as the broadcast content of an information program, with less difficulty and less burden in terms of a storage capacity in a state in which information can be easily handled.

Thus, it is desirable to satisfactorily store information provided as stream data and to handle such information easily.

An image processing apparatus according to an embodiment of the present invention includes image data capturing means for capturing a frame of stream image data displayed on a display device in accordance with an input capturing instruction, additional data generating means for generating additional data to be associated with the image data captured by the image data capturing means, and storage control means for storing into a predetermined storage unit the image data captured by the image data capturing means and the additional data generated by the additional data generating means in association with each other.

The image processing apparatus may further include list display control means for generating list image data of image data stored in the storage unit by the storage control means and for outputting the list image data to the display device.

The list display control means may search for or sort the image data stored in the storage unit in accordance with the additional data, and may generate the list image data in accordance with a result of searching or sorting.

The image processing apparatus may further include operation input means used for a user operation. The additional data generating means may generate the additional data using data input by an operation of the operation input means.

In this case, the data input by the operation of the operation input means may be, for example, character data.

The image processing apparatus may further include operation input means used for a user operation. The additional data generating means may generate the additional data using data selected by an operation of the operation input means.

In this case, the additional data generating means may generate selection candidate data and generate the additional data using the data selected from the selection candidate data by the operation of the operation input means.

The image processing apparatus may further include data acquiring means for acquiring data relating to the image data captured by the image data capturing means. The additional data generating means may generate the additional data using the data acquired by the data acquiring means.

An image processing method according to an embodiment of the present invention includes the steps of capturing a frame of stream image data displayed on a display device in accordance with an input capturing instruction, generating additional data to be associated with the image data captured by the image data capturing step, and storing into a predetermined storage unit the image data captured by the image capturing step and the additional data generated by the additional data generating step in association with each other.

The image processing method may further include the step of generating list image data of image data stored in the storage unit by the storing step and outputting the list image data to the display device.

The image processing apparatus and the image processing method described above are applicable to apparatuses handling stream data to be presented to users, such as television tuner apparatuses, image playback apparatuses, information processing apparatuses, and information processing apparatuses and image apparatuses on a network, such as a home network. The stream data may be, for example, image data received via television broadcasting, image data played back after being recorded by a recorder, or image data played back from a package medium, such as a digital versatile disc (DVD) or a Blu-Ray Disc™.

Stream data of a broadcast program or the like is displayed on a display device, such as a television monitor, as an image in real time or as an image played back after being recorded. If the broadcast program is the above-described information program, a viewer is able to acquire various types of information as the contents of the program. In the present invention, in this time, an image (a frame of image data) being displayed on the display device can be captured. In other words, a display screen as information that the user (viewer) wants to keep can be captured and stored. The captured image data is stored in association with additional data. The additional data may be characters input by the user, a keyword selected by the user, or information included in image data. Since the captured image data is stored in association with the additional data, handling based on the additional data, such as extraction, searching, sorting, and listing, can be performed.

Accordingly, a display screen (a frame of image data) that the user wants to store is extracted from stream image data and the extracted image data is stored in association with additional data. Thus, there is no need to store the stream data itself, that is, moving images of a broadcast program or the like, and a capacitive load for storing information is not increased. In addition, since image data for one screen, that is, static image data, is stored, effective information as an image is not lost. In addition, since the user is able to perform an operation for issuing a capturing instruction when the user is viewing a scene that the user wants to store, the user does not need to perform bothering operations, such as preparation for storing information.

In addition, since static image data associated with additional data is stored, information can be easily handled. Storing static image data is suitable for displaying a list of stored data or sequentially displaying the stored data. In addition, the content of information added to a captured image can be stored in accordance with the additional data. In addition, since searching and sorting using the additional data can be performed, stored data can be played back and confirmed easily and conveniently.

Since additional data is generated using desired input data, such as character data input by the user, additional data convenient for the user can be generated. In addition, since selection candidate data, such as keywords, is displayed and additional data is generated using data selected by the user, the user is able to input the additional data easily. In addition, additional data suitable for searching can be generated.

In addition, if additional data is generated by acquiring data relating to captured image data when information is included in the image data or when information relating to a program can be acquired, the user does not need to input additional data.

BRIEF DESCRIPTION OF THE DRAWINGS

FIG. 21 is an explanatory diagram showing another example of the network structure.

DETAILED DESCRIPTION

Figure 1:
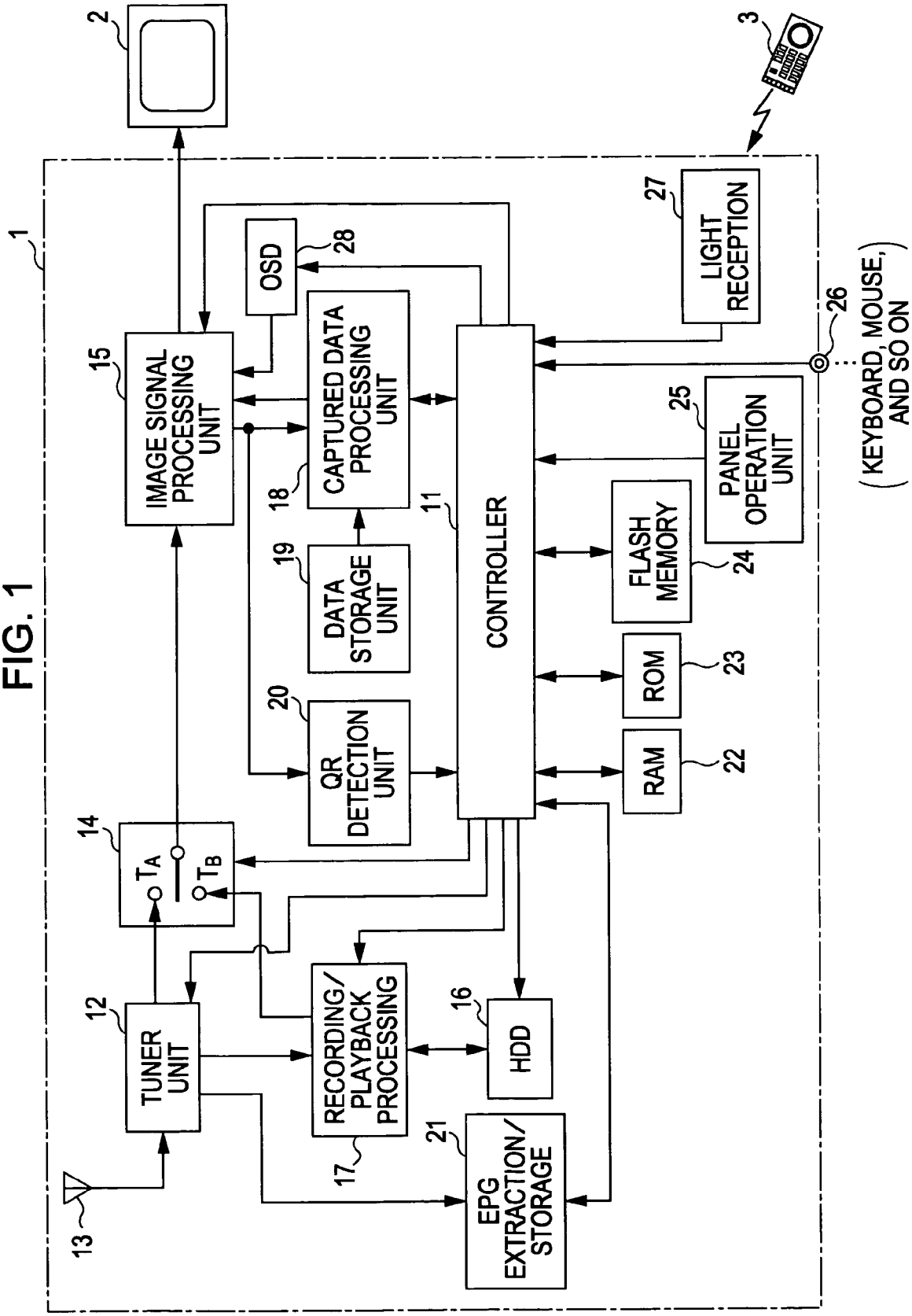
FIG. 1 is a block diagram showing a video recorder according to an embodiment of the present invention.

Embodiments of the present invention will be described with reference to the drawing.

FIG. 1 shows an example of the structure of an apparatus functioning as an image processing apparatus according to an embodiment of the present invention. In this example, a recording/playback apparatus containing a tuner for television broadcasting is shown. In the following descriptions, the recording/playback apparatus is referred to as a video recorder 1.

The video recorder 1 is connected to a display apparatus 2. The video recorder 1 supplies image signals to the display apparatus 2 and causes the display apparatus 2 to display broadcast images and playback images. The display apparatus 2 includes a predetermined display device, such as a cathode-ray tube (CRT) monitor device, a liquid crystal panel display device, or a plasma display panel display device.

Although the video recorder 1 is independent of the display apparatus 2 in this example, the video recorder 1 may be contained in the display apparatus 2.

In addition, the display apparatus 2 outputs sound together with image. In other words, the video recorder 1 supplies to the display apparatus 2 audio signals corresponding to images, together with image signals. However, an audio signal system is omitted in FIG. 1.

In the video recorder 1, a tuner unit 12 performs reception and demodulation processing on broadcast waves received via an antenna 13 to acquire stream image data as a broadcast program.

The tuner unit 12 supports various broadcasting systems, such as terrestrial digital broadcasting, terrestrial analog broadcasting, digital satellite broadcasting via broadcasting satellites or communication satellites, or analog satellite broadcasting via broadcasting satellites or communication satellites. The tuner unit 12 does not necessarily demodulate broadcast waves received via the antenna 13. The tuner unit 12 may function as a tuner or a decoder for so-called cable television broadcasts or streaming broadcasts supplied via a network, such as the Internet.

The tuner unit 12 also separates electronic programming guide (EPG) data superimposed on broadcast signals. Separated and extracted EPG data is captured into an EPG extraction/storage unit 21 to structure EPG data and store the structured EPG data.

A recording/playback processing unit 17 and a hard disc drive (HDD) 16 perform recording and playback of broadcast programs. In other words, for recording, the recording/playback processing unit 17 performs predetermined compression processing and encoding processing for recording on stream image data acquired in the tuner unit 12, and supplies the processed stream image data to the HDD 16. The HDD 16 records the supplied stream image data.

For playback, the recording/playback processing unit 17 performs decoding processing and decompression processing on image data read by the HDD 16, and outputs the processed image data as original stream image data.

A switch 14 is turned on and turned off for real-time viewing or playback viewing. When real-time viewing of a broadcast program is performed, a TA terminal of the switch 14 is connected. Thus, stream image data received and demodulated in the tuner unit 12 is supplied to an image signal processing unit 15.

In addition, when a broadcast program recorded on the HDD 16 is played back, a TB terminal of the switch 14 is connected. Thus, stream image data on which playback processing is performed in the recording/playback processing unit 17 is supplied to the image signal processing unit 15.

The image signal processing unit 15 performs processing for image signals to be displayed on the display apparatus 2.

For example, stream image data supplied from the tuner unit 12 or the recording/playback processing unit 17 via the switch 14 is subjected to necessary signal processing in the image signal processing unit 15, converted into an image signal in a predetermined system, such as an NTSC (National Television Standards Committee) system, and output to the display apparatus 2. Obviously, stream image data may be converted into an image signal in a PAL (phase-alternation line) system, a SECAM (sequential color and memory) system, or the like. In addition, output signals in each system may be of various types, such as composite video signals, Y/C signals, RGB signals, and the like.

The image signal processing unit 15 also extracts a frame of stream image data supplied to and displayed on the display apparatus 2 at that moment, and supplies the extracted stream image data as captured image data to a captured data processing unit 18 in accordance with a capturing instruction, which will be described later.

The captured data processing unit 18 performs processing for captured image data supplied from the image signal processing unit 15. For example, the captured data processing unit 18 performs processing of compressing the captured image data to store the captured image data, filing processing by associating the captured image data with additional data, which will be described later, writing and reading processing for a data storage unit 19, searching processing and sorting processing for a file (captured file, which will be described later) stored in the data storage unit 19, processing of generating a list image of captured files, and the like in accordance with instructions from a controller 11.

The data storage unit 19 stores captured files in accordance with an operation of the captured data processing unit 18. The data storage unit 19 may be, for example, a flash memory or an S-random-access memory (RAM) backed up by a power supply. Alternatively, the data storage unit 19 may be a recording medium, such as a memory card, an optical disc, a magnetic optical disc, or an HDD, or a corresponding recording/playback drive mechanism.

In addition, when, as in this example, the video recorder 1 includes the HDD 16 for a recording operation, the HDD 16 may also be used as the data storage unit 19, instead of individually providing the data storage unit 19. Obviously, if an optical disc, a magnetic optical disc, or a magnetic tape is used as a recording medium for recording a broadcast program, instead of the HDD 16, such recording medium may be used as the data storage unit 19.

When a quick response (QR) code is added to stream image code, a QR detection unit 20 extracts information recorded using the QR code. The QR detection unit 20 supplies the extracted information to the controller 11. The QR code is a type of a two-dimensional bar code. Here, a QR code is an example of information included in image data. Various procedures, such as a procedure for superimposing a two-dimensional bar code, which is typified by a QR code, as an image, a procedure for superimposing an information signal in a blanking period of an analog image signal, and a procedure for broadcasting additional information together with image data in digital broadcasting, are adopted as procedures for including data in image data. Here, an example in which a QR code is adopted is described. Thus, the QR detection unit 20 is provided.

An on screen display (OSD) processing unit 28 generates display image data under the control of the controller 11. When the OSD processing unit 28 generates image data, such as various characters and icons, the image data is superimposed on image signals in the image signal processing unit 15. Thus, the processed image data is displayed on the display apparatus 2.

The OSD processing unit 28 generates image data, such as various operation menu screens, graphical user interface (GUI) images of operation icons, messages, channel and volume control display, images for reservation registration, images for confirmation of reservation registration, and images for inputting additional data, which will be described later.

The controller 11 includes a microcomputer provided with a central processing unit (CPU). The controller 11 controls the entire video recorder 1. In other words, in accordance with a user operation and an operation program, the controller 11 instructs the tuner unit 12 to perform a channel selection operation, instructs the recording/playback processing unit 17 to perform processing for recording or playback, controls the operation of the HDD 16, controls the switching operation of the switch 14, instructs the image signal processing unit 15 to perform image signal processing and capturing processing, instructs the OSD processing unit 28 to generate an OSD image, instructs the captured data processing unit 18 to perform various operations, controls EPG data extraction and a storage operation of the EPG extraction/storage unit 21, and causes the EPG extraction/storage unit 21 to read EPG data.

A RAM 22, a read-only memory (ROM) 23, and a flash memory 24 serve as memory areas accessed by the controller 11.

A platform software module, a start module, and the like for operating the controller 11 (CPU) are stored in the ROM 23.

The RAM 22 temporarily stores the start module and the platform software program, such as an operating system (OS), stored in the ROM 23, an application program, or a parameter appropriately changing in accordance with execution of the program. The RAM 22 is also used as a work area for various types of arithmetic processing in the controller 11.

The flash memory 24 is used for storing information that, is not to be lost when the power is turned off, such as various processing coefficients and history information.

A panel operation unit 25, a remote commander 3, or connected keyboard and mouse are assumed as an operation input section used for a user operation.

The panel operation unit 25 includes operation elements, such as an operation key and an operation dial, provided on a casing of the video recorder 1. A user is able to input various instructions by operating the operation elements of the panel operation unit 25. The controller 11 detects operation input information input via the panel operation unit 25, performs predetermined control, and causes the video recorder 1 to perform an operation instructed by the user.

A similar operation can be performed using the remote commander 3. When the user operates the remote commander 3, for example, an operation signal is output as an infrared ray signal. The infrared-ray signal is received by a light-receiving unit 27, and converted into an electric signal. The converted electric signal is supplied to the controller 11. Obviously, the remote commander 3 handles, for example, electric waves, as well as infrared-ray signals.

A connection terminal 26 is provided for an external input device including a keyboard, a mouse, and the like. Since the external input device is connected to the connection terminal 26, operation information input from the external input device is supplied to the controller 11.

As user operations using the panel operation unit 25, the remote commander 3, or an external input device, for example, channel selection, recording, recording reservation, playback, searching, playback interruption, pause, and the like are performed as normal operations for the video recorder 1 including a tuner. However, as a characteristic operation in this example, an operation for issuing a capturing instruction can be performed. In addition, an operation for inputting additional data can be performed.

The structure of the video recorder 1 described with reference to FIG. 1 is merely an example for describing the operation below.

Figure 2:
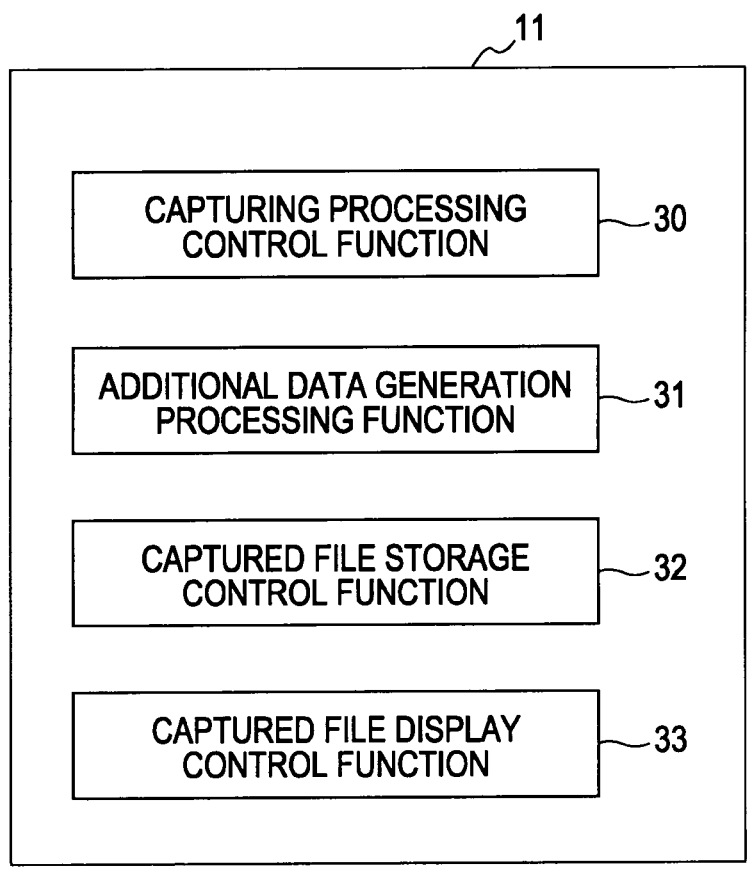
FIG. 2 is an explanatory diagram showing functions of a controller.

The controller 11 has software functions for executing the above-mentioned various types of control. In addition, the controller 11 includes software functional blocks as functions relating to an image capturing operation, which will be described later, as shown in FIG. 2. That is, the controller 11 includes a capturing processing control function 30, an additional data generation processing function 31, a captured file storage control function 32, and a captured file display control function 33.

The capturing processing control function 30 controls capturing of an image displayed on the display apparatus 2 in accordance with a user operation for issuing a capturing instruction. More specifically, when an image is displayed on the display apparatus 2, the capturing processing control function 30 controls the captured data processing unit 18 to capture image data for one frame from the image signal processing unit 15 in accordance with detection of a capturing operation performed by the user.

Since the user performs the operation for issuing the capturing instruction at a desired point in time while viewing the screen of the display apparatus 2, a slight time lag occurs between image data that can be actually captured and image data that the user is viewing. In other words, the image signal processing unit 15 captures image data that is delayed by some frames from a point in time when the user performs the operation. However, this delay is negligible since the captured image is substantially the same as the image viewed by the user. Alternatively, for example, if image data for frames corresponding to image signals output to the display apparatus 2 is stored for a while by providing a frame memory for some frames in the image signal processing unit 15, image data capturing with no time lag can be achieved.

The additional data generation processing function 31 generates additional data to be associated with captured image data. As described later, the additional data generation processing function 31 generates additional data in accordance with a user input or using information extracted by the QR detection unit 20 or the EPG extraction/storage unit 21, and supplies the generated additional data to the captured data processing unit 18.

In addition, when additional data is generated in accordance with a user input, the additional data generation processing function 31 performs character data input processing by a user operation or performs processing for setting a keyword, displaying the keyword on the display apparatus 2, and selecting the keyword in accordance with a user operation.

The captured file storage control function 32 controls an operation of the captured data processing unit 18 for storage into the data storage unit 19. That is, the captured file storage control function 32 issues an instruction for performing filing processing by associating image data captured by the captured data processing unit 18 with generated additional data, and instructs the data storage unit 19 to store the image data and the additional data.

The captured file display control function 33 controls processing for causing captured files stored in the data storage unit 19 to be displayed on the display apparatus 2. For example, the captured file display control function 33 instructs the captured data processing unit 18 to perform searching, sorting, and generation of a list image for captured files stored in the data storage unit 19, and controls the captured data processing unit 18 to supply to the display apparatus 2 via the image signal processing unit 15 image data to be displayed.

Under the control of the controller 11 having such various functions, capturing processing and display processing, which will be described later, are realized.

In the structural examples shown in FIGS. 1 and 2, an image data capturing section is implemented as the capturing processing control function 30 and operations executed by the image signal processing unit 15 and the captured data processing unit 18 under the control of the capturing processing control function 30.

In addition, an additional data generator corresponds to the additional data generation processing function 31.

In addition, a storage controller is implemented as the captured file storage control function 32 and an operation executed by the captured data processing unit 18 under the control of the captured file storage control function 32.

In addition, a list display controller is implemented as the captured file display control function 33 and an operation executed by the captured data processing unit 18 under the control of the captured file display control function 33.

In addition, the operation input section corresponds to the panel operation unit 25, the remote commander 3, the light-receiving unit 27, an external input device, the connection terminal 26 for the external input device, and the like.

In addition, a data acquisition section corresponds to the QR detection unit 20 and the EPG extraction/storage unit 21.

Figure 3A:
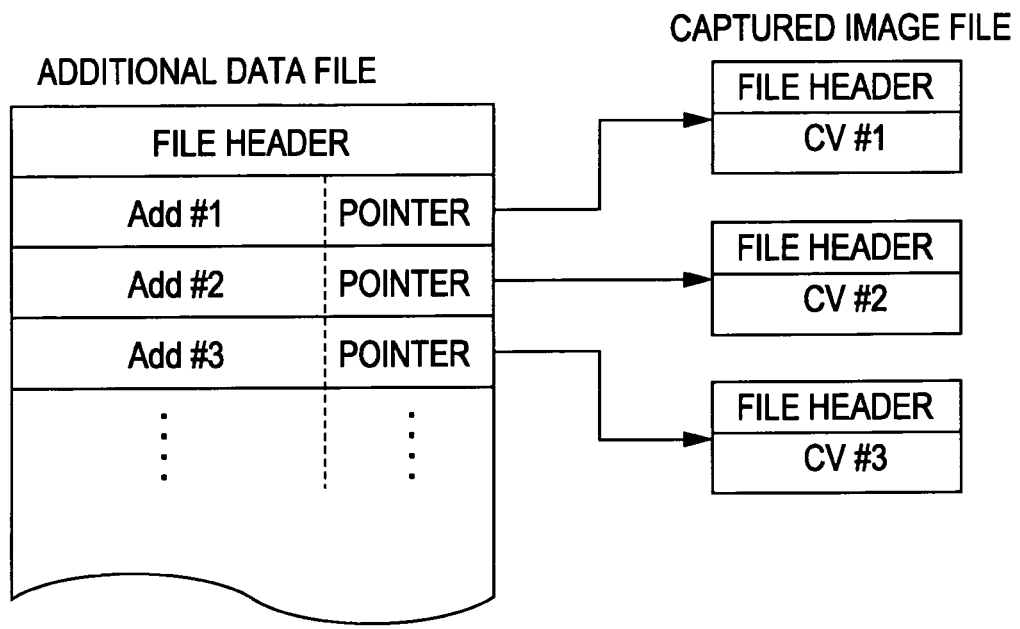
FIGS. 3A and 3B are explanatory diagrams showing examples of the format of a stored file.
Figure 3B:
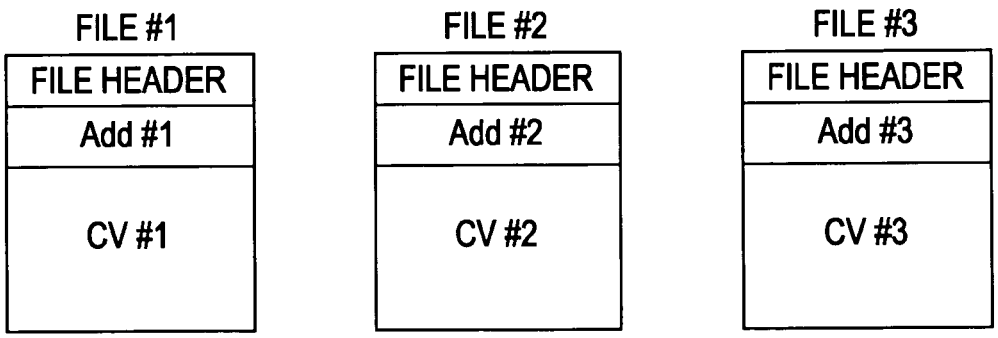

In this example, filing processing in which captured image data is associated with additional data is performed, and the captured image data and the additional data is stored into the data storage unit 19. FIGS. 3A and 3B show examples of formats of a captured file.

FIG. 3A is an example in which additional data and captured image data is stored in different file formats. Additional data is registered in an additional data file.

In the additional data file, the name of the file, the property, the size of the file, the number of pieces of registered additional data, the positions of the registered additional data (for example, offset bytes), the size, the registered date and time, the update date and time, and the like are described as a file header. Additional data, Add#1, Add#2, and so on, is included as actually registered data.

In contrast, a file header is added to each of pieces of captured image data, CV#1, CV#2, and so on, and each of the pieces of captured image data functions as a captured image file. In the captured image file, the name of the file, the size of the file, the property, a compression method, and the like are described as a file header.

In this case, for example, pointers are provided for the respective additional data Add#1, Add#2, and so on in the additional data file. Since a pointer indicates a corresponding captured image file (for example, the name and address of the file), a piece of additional data Add#x is associated with a captured image file (image data CV#x).

FIG. 3B shows an example in which a file is formed by additional data and captured image data.

For example, a file#1 includes additional data Add#1, image data CV#1, and a file header. In the file header, the name of the file, the property, the registration and update dates and times, the sizes of the additional data and the image data, a compression method, and the like are described.

A file#2 and file #3 are formed similarly.

For example, captured image data and additional data that is generated correspondingly to the captured image data is subjected to filing processing in accordance with the format shown in FIG. 3A or 3B and is stored into the data storage unit 19. Obviously, other file formats may be adopted. Any file format can be adopted as long as captured image data is associated with a piece or a plurality of pieces of additional data that is generated correspondingly to the captured image data.

FIGS. 4A and 4B and FIGS. 5A and 5B show examples of image data and additional data that is associated with each other in the filing processing described above.

Figure 4A:
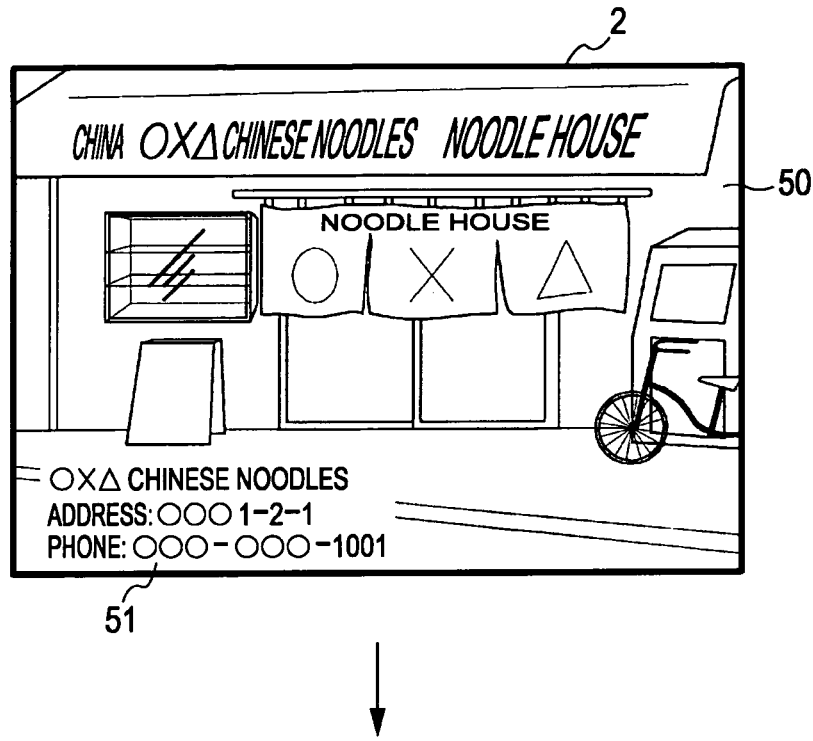
FIGS. 4A and 4B are explanatory diagrams of captured files.

FIG. 4A shows a scene of an image displayed on the display apparatus 2. For example, a scene in which a Chinese noodle restaurant is presented in a program featuring Chinese noodle restaurants as an information program is shown in FIG. 4A. In this image, a subtitle 51 providing the name of the restaurant and the like is displayed on an appearance 50 of the restaurant.

Figure 4B:
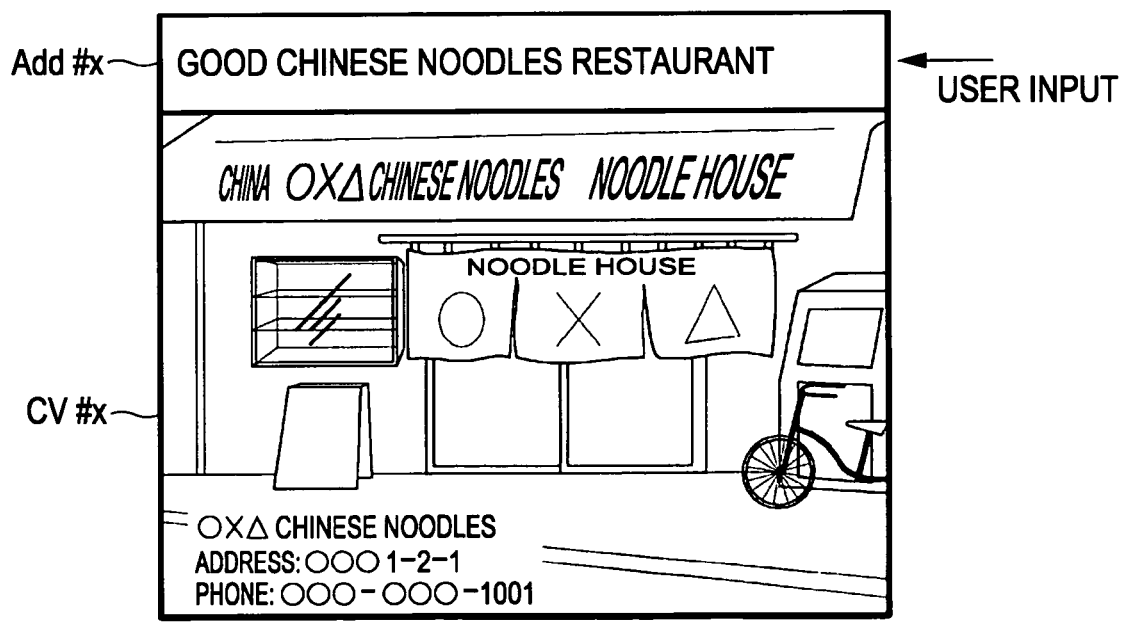

If a user issues a capturing instruction when viewing the scene, image data CV#x corresponding to the scene is captured, and stored in the format shown in FIG. 3A or 3B in association with additional data Add#x, as shown in FIG. 4B. In the example shown in FIG. 4B, the user inputs a character string "good Chinese noodles restaurant" by an input operation, and the input character data is displayed as the additional data Add#x. The user can input characters immediately after issuing a capturing instruction or afterwards.

Figure 5A:
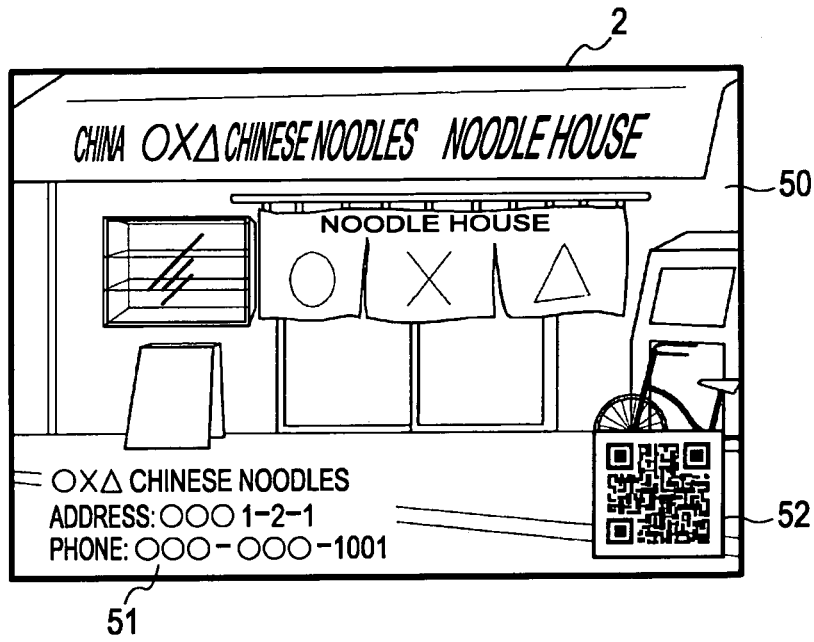
FIGS. 5A and 5B are explanatory diagrams of captured files.

FIG. 5A shows a scene of an information program similar to that shown in FIG. 4A. In the example shown in FIG. 5A, a QR code 52 is included in part of the screen. In this case, additional data Add#x can be generated from information extracted from image data.

Figure 5B:
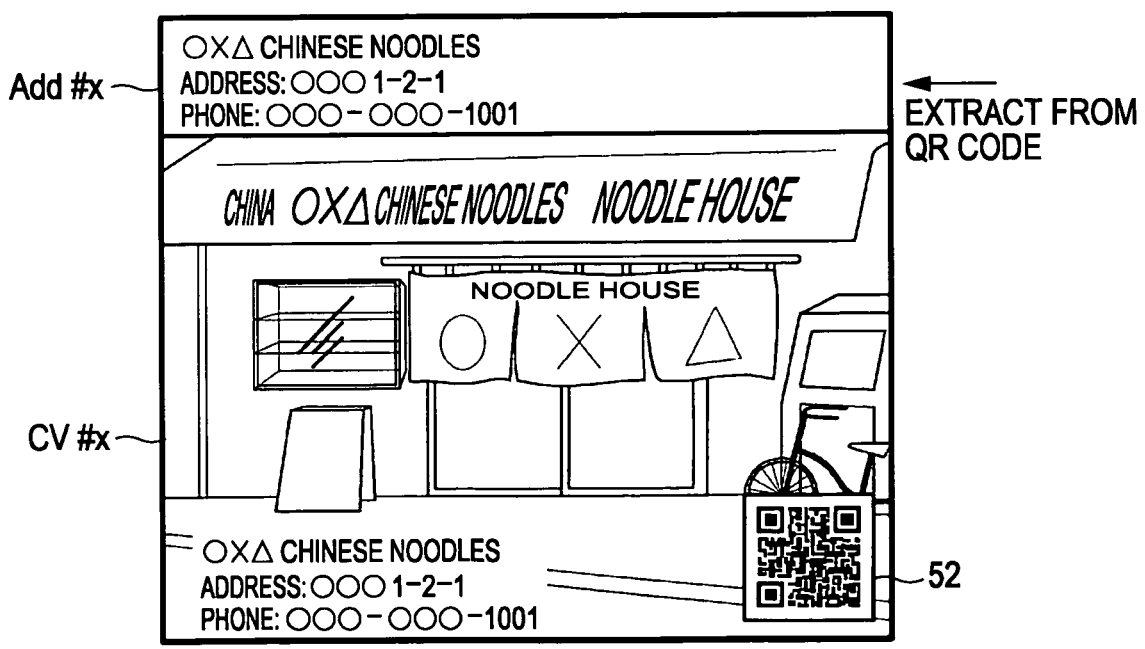

When the user issues a capturing instruction when viewing the scene shown in FIG. 5A, image data CV#x corresponding to the scene is captured, as shown in FIG. 5B. The captured image data CV#x is also supplied to the QR detection unit 20. The QR detection unit 20 detects and decodes the QR code 52 included in the image data, and extracts information recorded using the QR code 52. Thus, additional data Add#x is generated in accordance with the extracted information. For example, when the QR code 52 includes the name, address, and telephone number of the restaurant, character data indicating the name, address, and telephone number of the restaurant serves as the additional data Add#x, as shown in FIG. 5B. The additional data Add#x is stored in association with the image data CV#x in the format shown in FIG. 3A or 3B.

First, second, and third examples of a capturing process performed by the video recorder 1 in this embodiment will now be described. The first, second, and third examples of the capturing process are realized by implementation of the capturing processing control function 30, the additional data generation processing function 31, and the captured file storage control function 32 shown in FIG. 2 under the control of the controller 11.

A control process performed by the controller 11 will be described as the first example of the capturing process with reference to FIG. 6. In the first example of the capturing process, additional data is generated in accordance with a user input.

Figure 6:
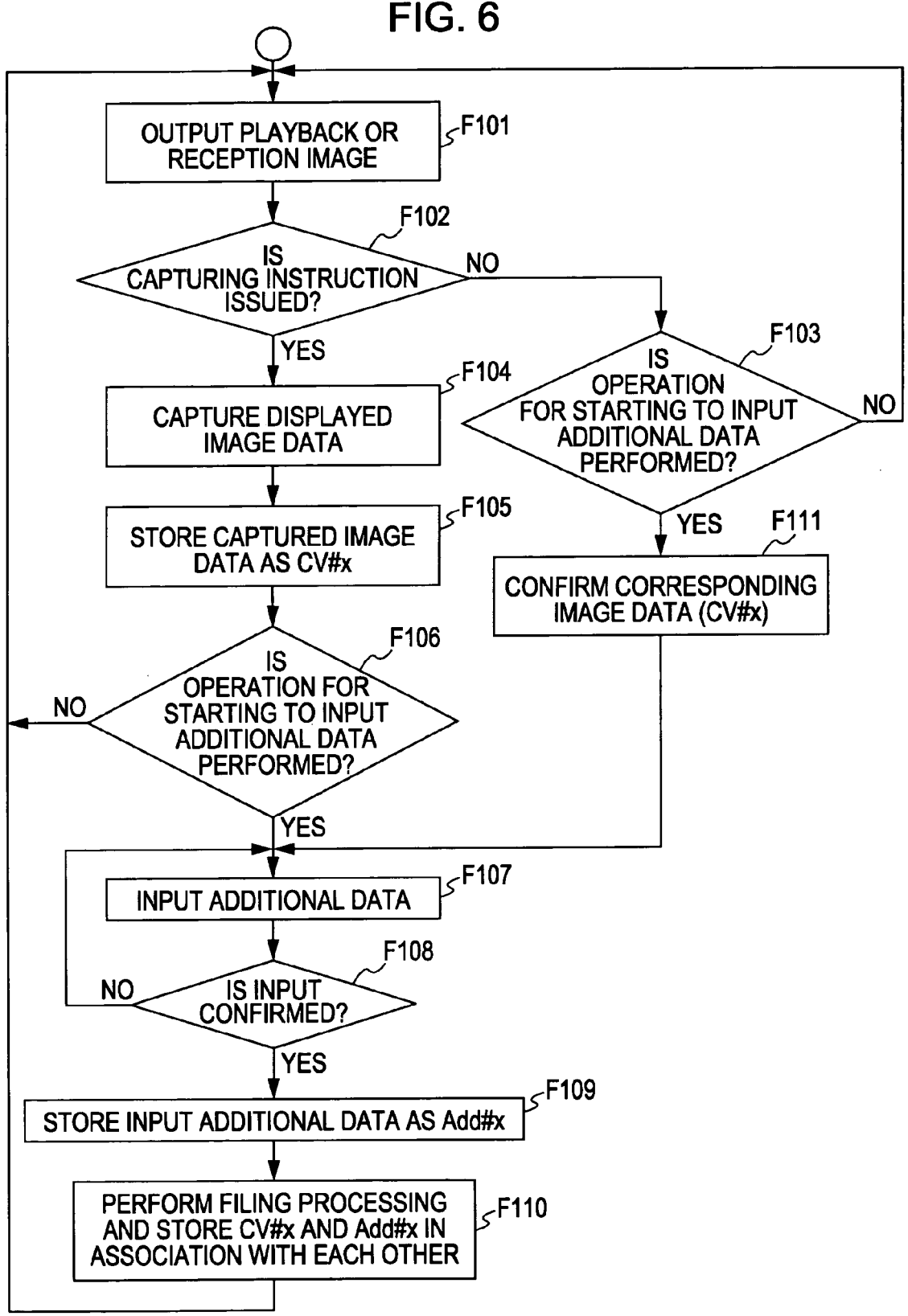
FIG. 6 is a flowchart of a first example of a capturing process.

Referring to FIG. 6, in step F101, the image signal processing unit 15 supplies to the display apparatus 2 stream image data that is received and demodulated in the tuner unit 12 or stream image data that is read from the HDD 16 and played back by the recording/playback processing unit 17, and causes the display apparatus 2 to display and output the stream image data. In other words, the controller 11 instructs the image signal processing unit 15, and the tuner unit 12 or the HDD 16 and the recording/playback processing unit 17 to perform normal operations.

During a period in which a program image and the like based on the stream image data is displayed on the display apparatus 2 under the control in step F101, the controller 11 monitors an operation input by the user in steps F102 and F103.

The operation input by the user is performed using the panel operation unit 25, the remote commander 3, or an external input device connected to the connection terminal 26.

When it is detected in step F102 that the user performs an operation for issuing a capturing instruction, the controller 11 proceeds to step F104.

In step F104, a frame of image data corresponding to a display screen at a point in time when the capturing instruction is issued is supplied from the image signal processing unit 15 to the captured data processing unit 18. In other words, capturing of image data is performed. Then, in step F105, the captured image data is stored as image data CV#x. For example, the captured image data is stored into the data storage unit 19 as image data CV#x that is associated with no additional data. The image data CV#x may be acquired by compressing the frame of captured image data.

Then, in step S106, the controller 11 monitors whether or not an operation for inputting additional data starts immediately after the capturing instruction is issued.

Various types of processing while waiting for a user operation can be considered.

For example, when a predetermined time passes after the operation for issuing the capturing instruction is performed, it is determined whether or not the user starts an operation for inputting additional data. For example, an operation key or the like used for designating an additional data input mode is prepared, and it is determined whether or not the user performs the operation. If it is determined in step F106 that the user does not perform an operation for inputting additional data after a predetermined time passes, the process returns to step F101.

In addition, the OSD processing unit 28 may display a message asking the user whether or not to continuously input additional data and operation icons, "YES" and "NO", by OSD display on the display screen of the display apparatus 2. In accordance with a user operation for the display, the determination in step F106 may be performed. That is, the determination of whether or not the user inputs additional data is performed in accordance with a user input for the message.

In addition, during the period while waiting for existence or nonexistence of an input of additional data in step F106, a captured image may be fixedly displayed on the screen of the display apparatus 2. Alternatively, the captured image may be displayed on a sub-screen (or, on the contrary, the captured image may be displayed on a main screen) in a picture-in-picture (PinP) mode while continuing to display moving images in the program.

If it is determined in step F106 that the user does not perform an operation for starting to input additional data immediately after performing the operation for issuing the capturing instruction, the process returns to step F101. That is, in this case, it is determined that the user will input additional data afterwards for the captured image data CV#X.

In contrast, if the user performs an operation for inputting additional data, for example, an operation for designating the additional data input mode, the controller 11 proceeds to step F107 to perform additional data input processing corresponding to a user operation. As described later, for example, in step F107, as additional data input processing, processing for character input, keyword display, and keyword selection by the user is performed.

Then, if the input content is confirmed by an input confirmation operation by the user in step F108, the process proceeds to step F109 to generate additional data in accordance with the set input data, to transfer the generated additional data to the captured data processing unit 18, and to store the additional data as additional data Add#x corresponding to the captured image data CV#x.

Then, in step F110, filing processing is performed by associating the image data CV#x stored in advance in the captured data processing unit 18 with the additional data Add#x, and the image data CV#x and the additional data Add#x is stored in the data storage unit 19, for example, in the file format shown in FIG. 3A or 3B.

Then, the process returns to step F101.

In contrast, when an operation for starting to input additional data is performed by the user, for example, when an operation for setting the additional data input mode is detected in step F103 under the normal moving image output control in step F101, the controller 11 proceeds to step F111. This is a case where the user intends to input additional data for image data CV#x that has already been captured and that is not stored as a file in association with additional data. Alternatively, this is a case where the user wants to perform editing, such as correction of additional data, even if filing processing has already been performed on the image data CV#x so as to be associated with the additional data.

In step F111, image data CV#x corresponding to additional data to be input is specified. For example, image data CV#x that is stored in the data storage unit 19 in association with no additional data (that is, the image data CV#x stored in step F105) may be read, and a list of the read data may be displayed on the screen of the display apparatus 2 so that the user is able to select corresponding image data. Alternatively, when editing is taken into consideration, a list of all the image data CV#x may be displayed, irrespective of whether or not image data is associated with additional data, so that the user is able to select corresponding image data.

In addition, instead of displaying a list, for example, a procedure for sequentially displaying image data from the last captured image data in terms of time so that the user is able to select corresponding image data may also be adopted.

Any procedure can be adopted as long as the user is able to designate one of already captured pieces of image data CV#x.

If image data CV#x that is to be associated with additional data to be input by the user is confirmed by user designation, the process proceeds to the input processing in step F107. Then, if the input content is confirmed in steps F107 and F108, filing processing is performed such that the additional data Add#x and the image data CV#x is associated with each other in steps F109 and F110, and the additional data Add#x and the image data CV#x is stored into the data storage unit 19.

As described above, image data is captured in accordance with a user operation for issuing a capturing instruction, and additional data generated in accordance with a user input is stored into the data storage unit 19 in association with the image data.

That is, information that the user wants to store can be stored as an image on the screen combined with characters and the like input as additional data. Thus, since effective information can be stored as an image and information appropriate for the user can be added as additional data, information useful for the user can be stored. For example, compared with a case where a memorandum is made using paper or a personal computer, a significantly greater amount of valuable information can be stored.

In addition, in order to store information, the user is able to perform an operation for issuing a capturing instruction while viewing a program or the like. Additional data may be input immediately after the operation for issuing the capturing instruction is performed or afterwards. Thus, information can be stored by an easy operation, and the user spends less time and efforts. For example, time and efforts for preparing paper and writing implements, starting a personal computer, or preparing a camera for storing information is not required.

In addition, as described later, image data associated with additional data is stored. Thus, stored information can be handled easily.

In the process shown in FIG. 6, the processing in steps F102, F104, and F105 is performed under the control of the capturing processing control function 30 shown in FIG. 2. In addition, the processing in steps F106, F107, F108, F109, F103, and F111 is performed under the control of the additional data generation processing function 31. In addition, the processing in step F110 is performed under the control of the captured file storage control function 32.

A control process performed by the controller 11 is described next as the second example of the capturing process with reference to FIG. 7. In the second example of the capturing process, additional data is generated in accordance with information included in image data. Here, an example in which an image as a QR code is included within stream image data, as shown in FIGS. 5A and 5B, is described.

Figure 7:
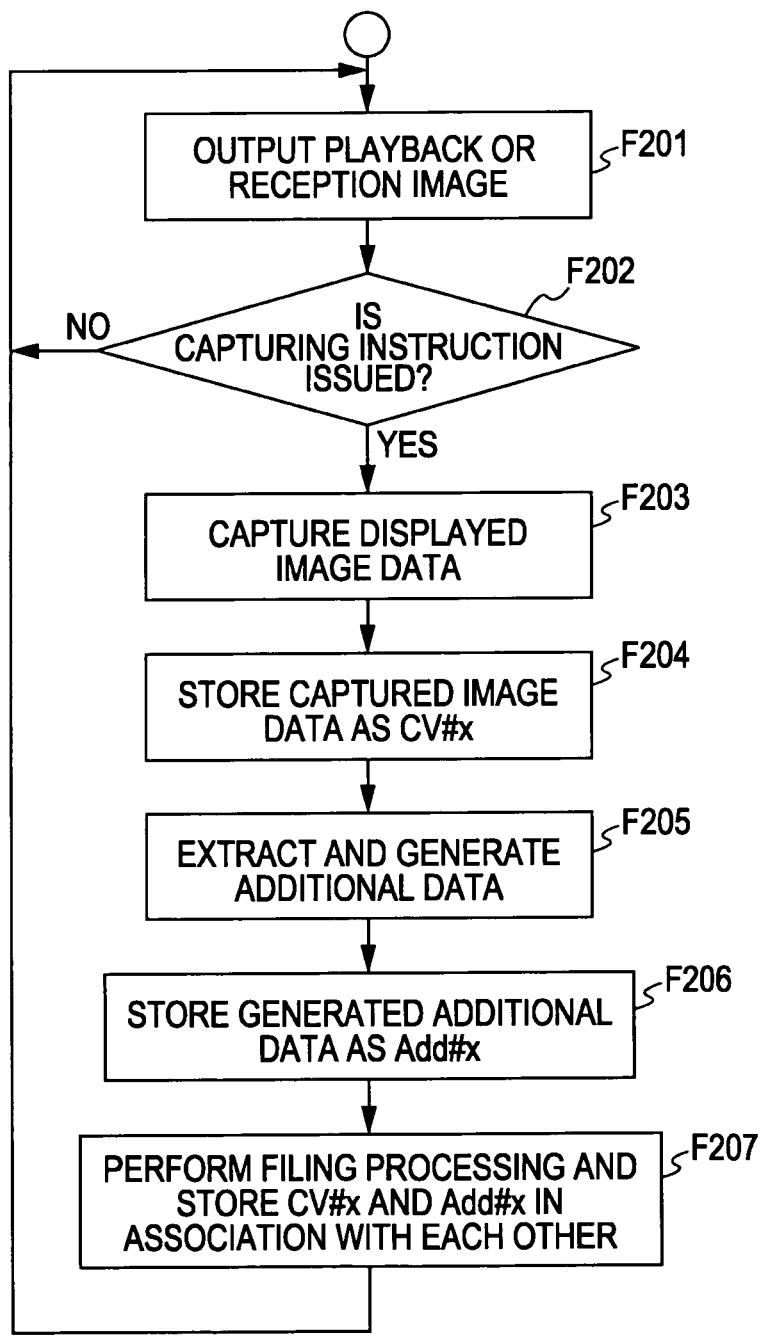
FIG. 7 is a flowchart of a second example of the capturing process.

Referring to FIG. 7, in step F201, the image signal processing unit 15 supplies to the display apparatus 2 stream image data that is received and demodulated in the tuner unit 12 or stream image data that is read from the HDD 16 and played back by the recording/playback processing unit 17, and causes the display apparatus 2 to display and output the stream image data, as in step F101 shown in FIG. 6.

During a period in which the display apparatus 2 displays a program image or the like based on the stream image data under the control of the processing in step F201, the controller 11 monitors an operation input by the user in step F202.

If it is detected in step F202 that the user performs an operation for issuing a capturing instruction, the controller 11 proceeds to step F203. In step F203, a frame of image data corresponding to a display screen at a point in time when the capturing instruction is issued is supplied from the image signal processing unit 15 to the captured data processing unit 18. In other words, capturing of image data is performed. Then, in step F204, the captured image data is stored as image data CV#x. For example, the captured image data is stored into the data storage unit 19 as image data CV#x that is associated with no additional data. The image data CV#x may be acquired by compressing the frame of captured image data.

The frame of captured image data is also supplied to the QR detection unit 20.

Then, in step F205, the controller 11 captures information detected by the QR detection unit 20, and generates additional data in accordance with the information.

The QR detection unit 20 detects an image portion as a QR code in the frame of captured image data, decodes the QR code by analyzing the QR code, and extracts information recorded as the QR code. The QR detection unit 20 supplies the extracted information to the controller 11. The controller 11 generates additional data using the extracted information. In step F206, the generated additional data is stored in the captured data processing unit 18 as additional data Add#x corresponding to the captured image data CV#x.

Then, in step F207, filing processing in which the image data CV#x that is already stored in the captured data processing unit 18 is associated with the additional data Add#x is performed, and the image data CV#x and the additional data Add#x is stored into the data storage unit 19, for example, in the file format shown in FIG. 3A or 3B.

Then, the process returns to step F201.

As described above, image data is captured in accordance with a user operation for issuing a capturing instruction, and additional data generated in accordance with information extracted from the image data is stored into the data storage unit 19 in association with the image data. In this case, the user only issues a capturing instruction, and does not perform an input operation for generating additional data. Thus, in addition to advantages similar to those in the first example of the capturing process, operations can be performed much easier.

In addition, additional data is not necessarily based on a QR code. For example, if information on a program is stored in the EPG extraction/storage unit 21, the stored information may be used. For example, for a program featuring Chinese noodle restaurants, character data "Chinese noodle restaurant" can be extracted from EPG data. The extracted character data may be stored as additional data.

In addition, obviously, for example, when a bar code or a two-dimensional bar code other than a QR code is used, when additional information as digital image data is included, or when information is superimposed in a blanking period of an analog broadcast image signal, corresponding information may be extracted to generate additional data using the extracted information.

In the process shown in FIG. 7, the processing in steps F202, F203, and F204 is performed under the control of the capturing processing control function 30 shown in FIG. 2. In addition, the processing in steps F205 and F206 is performed under the control of the additional data generation processing function 31. In addition, the processing in step F207 is performed under the control of the captured file storage control function 32.

A control process performed by the controller 11 is described next as the third example of the capturing process with reference to FIG. 8. In the third example of the capturing process, additional data is generated in accordance with a user input and in accordance with data extracted from image data.

Figure 8:
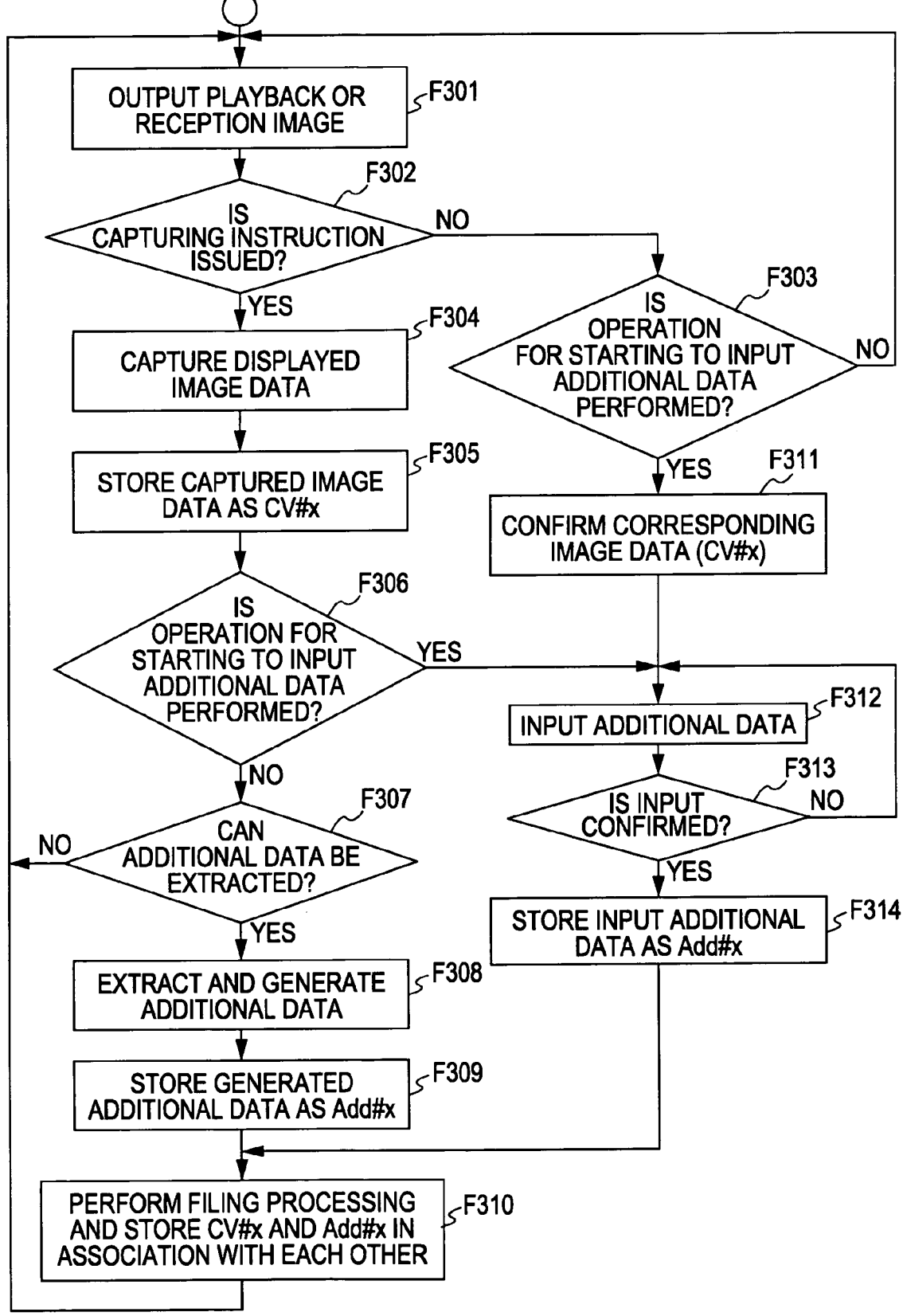
FIG. 8 is a flowchart of a third example of the capturing process.

Referring to FIG. 8, in step F301, the image signal processing unit 15 supplies to the display apparatus 2 stream image data that is received and demodulated in the tuner unit 12 or stream image data that is read from the HDD 16 and played back by the recording/playback processing unit 17, and causes the display apparatus 2 to display and output the stream image data, as in step F101 shown in FIG. 6.

During a period in which the display apparatus 2 displays a program image or the like based on the stream image data under the control of the processing in step F301, the controller 11 monitors an operation input by the user in steps F302 and F303.

If it is detected in step F302 that the user performs an operation for issuing a capturing instruction, the controller 11 proceeds to step F304.

In step F304, a frame of image data corresponding to a display screen at a point in time when the capturing instruction is issued is supplied from the image signal processing unit 15 to the captured data processing unit 18. In other words, capturing of image data is performed. Then, in step F305, the captured image data is, for example, compressed and stored as image data CV#x. For example, the captured image data is stored into the data storage unit 19 as image data CV#x that is associated with no additional data.

The captured image data is also supplied to the QR detection unit 20.

In step F306, the controller 11 monitors whether or not the user starts an operation for inputting additional data immediately after the capturing instruction is issued. Various types of processing can be considered for this determination, as in step F106 in FIG. 6.

If it is detected in step F306 that the user does not perform an operation for starting to input additional data immediately after the capturing instruction is issued, the process proceeds to step F307. In step F307, the controller 11 determines whether or not information to be used as additional data can be extracted. For example, it is determined whether or not effective information to be used as additional data is supplied from the QR detection unit 20.

As described in the second example of the capturing process, for example, if a QR code is included in the captured image data, the QR detection unit 20 is capable of extracting information to be used as additional data from the QR code. However, a broadcasting industry side provides QR codes, and a QR code is not necessarily included on the display. In addition, information recorded using a QR code is not necessarily data appropriate to be used as additional data, such as text data or uniform resource locator (URL).

Thus, when information, such as text data, necessary for generating additional data is acquired from the QR detection unit 20, the controller 11 determines in step F307 that additional data can be extracted. Then, the process proceeds to step F308. In step F308, additional data is generated in accordance with the information supplied from the QR detection unit 20.

In step F309, the controller 11 transfers the generated additional data to the captured data processing unit 18, and stores the additional data as additional data Add#x corresponding to the captured image data CV#x.

In step F310, filing processing in which the image data CV#x is associated with the additional data Add#x is performed, and the image data CV#x and the additional data Add#x is stored into the data storage unit 19, for example, in the file format shown in FIG. 3A or 3B.

Then, the process returns to step F301.

If it is determined in step F307 that additional data cannot be extracted, the controller 11 returns to step F301. That is, in this case, additional data corresponding to the captured image data CV#x is generated based on data input later by the user.

In contrast, if it is determined in step F306 that the user performs an operation for inputting additional data, for example, an operation for designating the additional data input mode, immediately after the capturing instruction is issued, the controller 11 proceeds to step F312 to perform additional data input processing corresponding to the subsequent user operation. As described later, for example, in step F312, as additional data input processing, processing for character input, keyword display, and keyword selection by the user is performed.

If the input content is confirmed by an input confirmation operation by the user in step F313, the process proceeds to step F314 to generate additional data in accordance with the set input data, to transfer the generated additional data to the captured data processing unit 18, and to store the additional data as additional data Add#x corresponding to the captured image data CV#x.

Then, in step F310, filing processing in which the image data CV#x is associated with the additional data Add#x is performed by the captured data processing unit 18, and the image data CV#x and the additional data Add#x is stored into the data storage unit 19, for example, in the file format shown in FIG. 3A or 3B.

Then, the process returns to step F301.

In contrast, when an operation for starting to input additional data is performed by the user, for example, when an operation for setting the additional data input mode is detected in step F303 under the normal moving image output control in step F301, the controller 11 proceeds to step F311. This is a case where the user intends to input additional data for image data CV#x that has already been captured and that is not stored as a file in association with additional data. Alternatively, this is a case where the user wants to perform editing, such as correction of additional data, even if filing processing is performed on the image data CV#x so as to be associated with the additional data. In the processing in step F311, as in step F111 in FIG. 6, one of the already captured pieces of image data CV#x is specified in accordance with a user designation.

If image data CV#x that is to be associated with additional data to be input by the user is confirmed by the user designation, the process proceeds to input processing in step F312. Then, if the input content is confirmed in steps F312 and F313, as described above, the process proceeds to step F314. In steps F314 and F310, filing processing is performed such that the additional data Add#x and the image data CV#x is associated with each other, and the additional data Add#x and the image data CV#x is stored into the data storage unit 19.

As described above, image data is captured in accordance with a user operation for issuing a capturing instruction, and additional data generated in accordance with a user input or in accordance with information extracted from the image data is stored into the data storage unit 19 in association with the image data.

In this case, not only advantages similar to those in the first example of the capturing process can be achieved, but time and efforts required for the user are also eliminated since additional data is automatically generated based on extracted information without a user operation for inputting additional data. In contrast, if the user wants an image to be accompanied with characters, characters can be input and stored as additional data. That is, usability appropriate for a user can be achieved.

In addition, when additional data is generated based on information acquired from the QR detection unit 20, if the content of the additional data is information that is not appropriate for the user, the additional data can be edited in the processing in steps F303, F311, and F312. Thus, information can be stored in a state that is appropriated for the user.

In the process shown in FIG. 8, additional data is generated using information acquired from the QR detection unit 20 when the user does not input additional data in steps F306 and F307. In contrast, by reversing the order of the steps F306 and F307, it may be determined whether or not the user performs an input operation if information to be used as additional data cannot be extracted.

In the process shown in FIG. 8, the processing in steps F302, F304, and F305 is performed under the control of the capturing processing control function 30 shown in FIG. 2. In addition, the processing in steps F306, F307, F308, F309, F303, F311, F312, F313, and F314 is performed under the control of the additional data generation processing function 31. In addition, the processing in step F310 is performed under the control of the captured file storage control function 32.

Examples in which additional data is generated in accordance with a user input have been described as the first example of the capturing process shown in FIG. 6 and the third example of the capturing process shown in FIG. 8.

Various examples of methods for inputting additional data by the user will be described next.

As a method for inputting additional data, a method in which a user inputs characters or the like that the user wants to store as additional data is available.

Figure 9A:
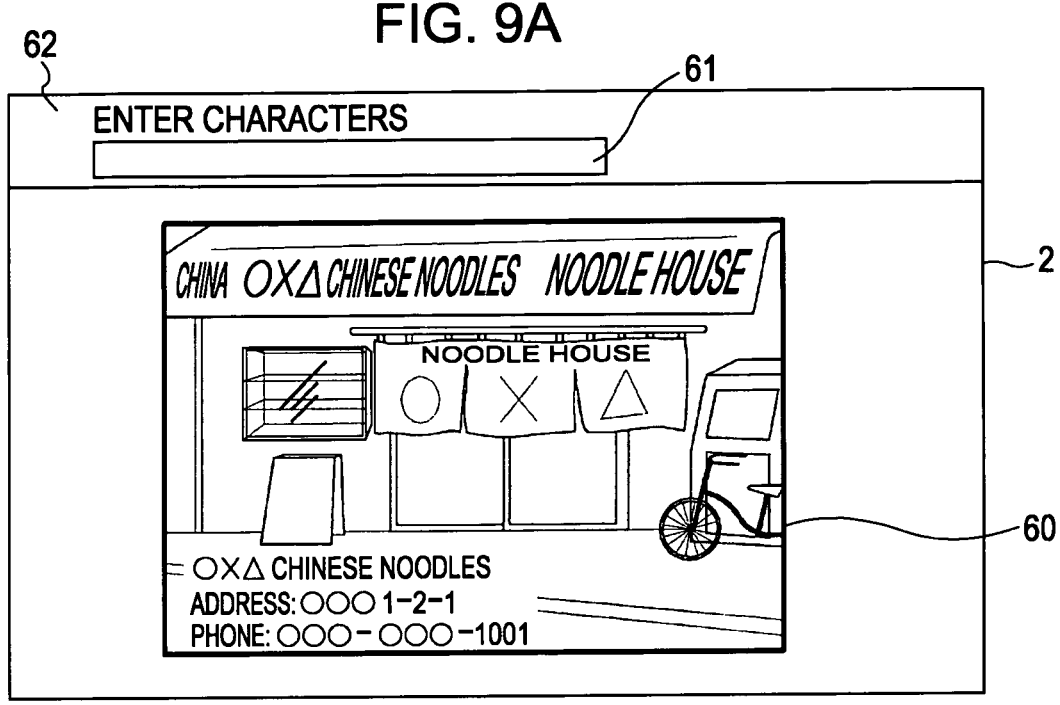
FIGS. 9A and 9B are explanatory diagrams for inputting of additional data.

In this method, for example, when detecting a user operation for setting the additional data input mode, the controller 11 controls the captured data processing unit 18, the OSD processing unit 28, and the image signal processing unit 15 in step F107 shown in FIG. 6 or in step F312 in FIG. 8 to display a screen, for example, shown in FIG. 9A on the display apparatus 2.

In the example shown in FIG. 9A, an image 60 of captured image data CV#x for which additional data to be input by the user is to be provided is displayed, and a message 62 for urging the user to input characters and a character input box 61 are displayed.

The image shown in FIG. 9A (and images shown in FIGS. 9B, 10, and 11) may be displayed on the entire screen of the display apparatus 2 or may be displayed on a sub-screen or a main screen together with a program image or the like being output.

The user inputs desired characters using the panel operation unit 25, the remote commander 3, or an external input device, such as a keyboard, while viewing, for example, the display screen shown in FIG. 9A. Input characters are displayed within the character input box 61, and the input content is confirmed in accordance with an input confirmation operation by the user.

The character data input and confirmed as described above can be stored as additional data Add#x in step F109 or F314.

In order to support an input operation, words included in EPG data of a program from which an image is captured can be registered in a dictionary so that the registered words can be used for prediction input. Thus, an operation for inputting information can be further simplified.

Instead of directly inputting characters by a user operation, a method for selecting a candidate character, such as a keyword, is available.

Figure 9B:
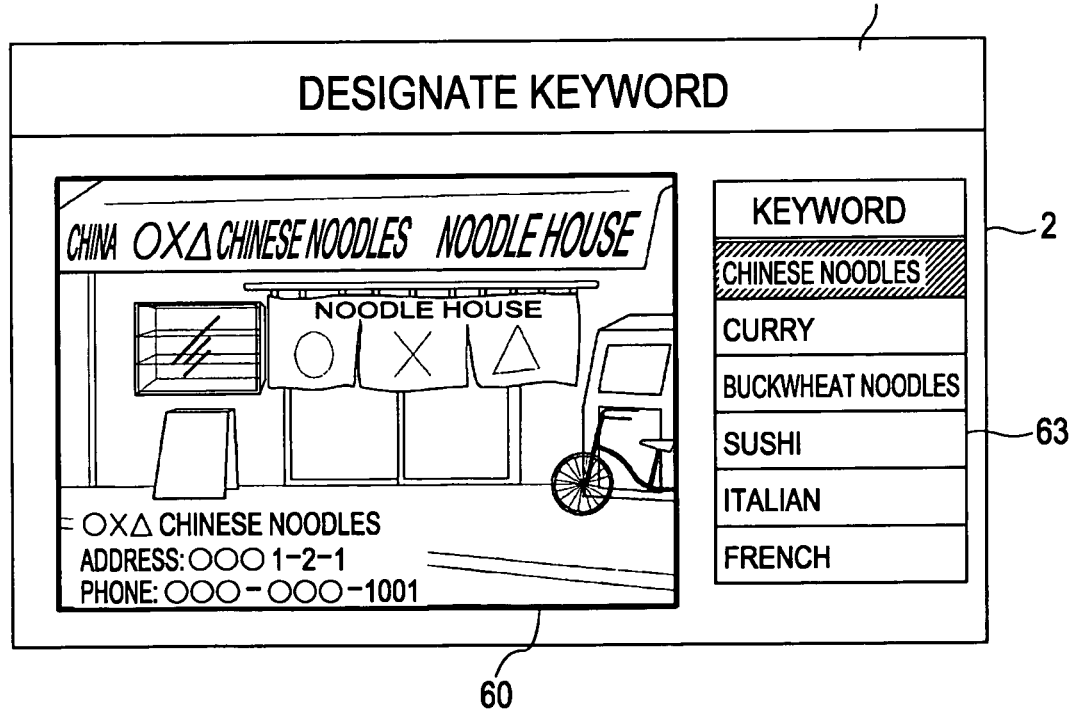

For example, when detecting a user operation for setting the additional data input mode, the controller 11 controls the captured data processing unit 18, the OSD processing unit 28, and the image signal processing unit 15 in step F107 or F312, and displays a screen, for example, shown in FIG. 9B, on the display apparatus 2.

In the example shown in FIG. 9B, the image 60 of captured image data CV#x for which additional data to be input by the user is to be provided is displayed, and a message 64 for urging the user to select a keyword and a keyword box 63 are displayed.

The user may be able to hierarchically select a candidate keyword in a menu format from a keyword group set in advance. For example, when a category or the like for a keyword is selected and a group, such as a restaurant, is selected, candidate keywords shown in FIG. 9B can be displayed.

Alternatively, a keyword generated from EPG data extracted by the EPG extraction/storage unit 21 may be displayed in the keyword box 63, as shown in FIG. 9B.

Alternatively, the content of a program is determined from EPG data, and a keyword group corresponding to the content of the program may be displayed. For example, when EPG data includes characters "Chinese noodles", a keyword group including "Chinese noodles" is displayed, as shown in FIG. 9B.

The user selects a desired keyword within the keyword box 63 using the panel operation unit 25, the remote commander 3, or an external input device, such as a keyboard or a mouse, while viewing the display screen shown in FIG. 9B, and performs a confirmation operation, such as clicking. For example, as shown in FIG. 9B, the user selects the keyword "Chinese noodles".

The keyword selected as described above can be stored as additional data Add#x in step F109 or F314.

The display apparatus 2 displays a screen for inputting characters for additional data, as shown in FIG. 9A, or for selecting a keyword for additional data, as shown in FIG. 9B. There is a case where the user wants to avoid interruption of display of an image of a program being broadcasted or being played back.

Figure 10:
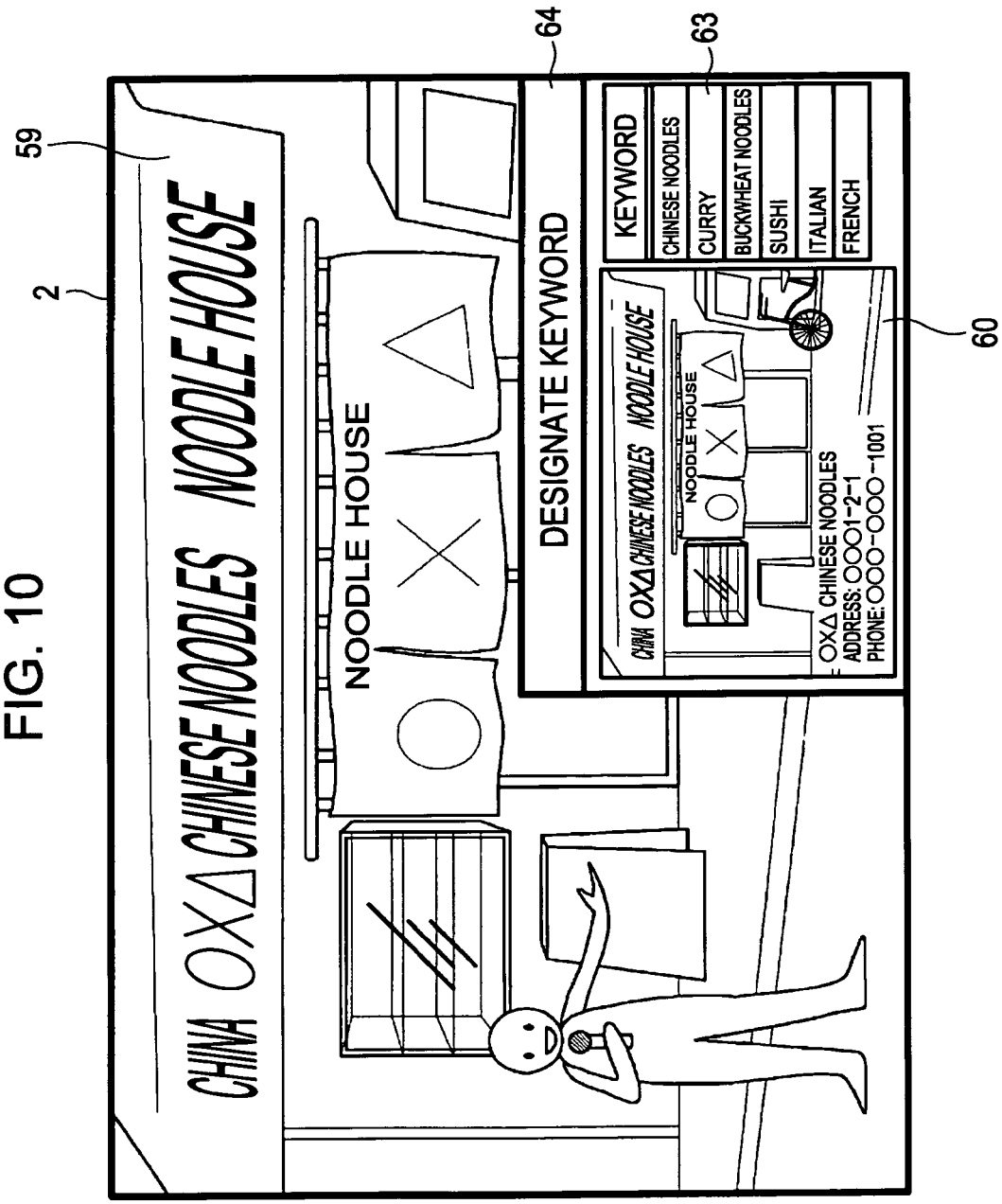
FIG. 10 is an explanatory diagram showing an example of a display screen when additional data is input.

When the screen for inputting additional data shown in FIG. 9A or 9B is displayed, PinP display can be performed, as shown in FIG. 10. In other words, for example, an image 59 being broadcasted is displayed on a main screen, and the captured image 60, the message 64, and the keyword box 63 are displayed on a sub-screen as an image for inputting additional data, as shown in FIG. 9B. Accordingly, a broadcast image or a playback image is not interrupted due to input of additional data during an operation period. Thus, PinP display is also suitable for a case where additional data is input immediately after a capturing operation, that is, during an image is being broadcasted.

For example, when the process proceeds in the order of steps F103, F111, and F107 in FIG. 6 or when the process proceeds in the order of steps F303, F311, and F312 in FIG. 8, in addition to a case where, as described above, additional data Add#x has not been generated, a user may want to edit additional data Add#x.

In other words, image data CV#x that is already associated with additional data Add#x may be selected as image data for which additional data is to be input in step F111 or F311.

Figure 11:
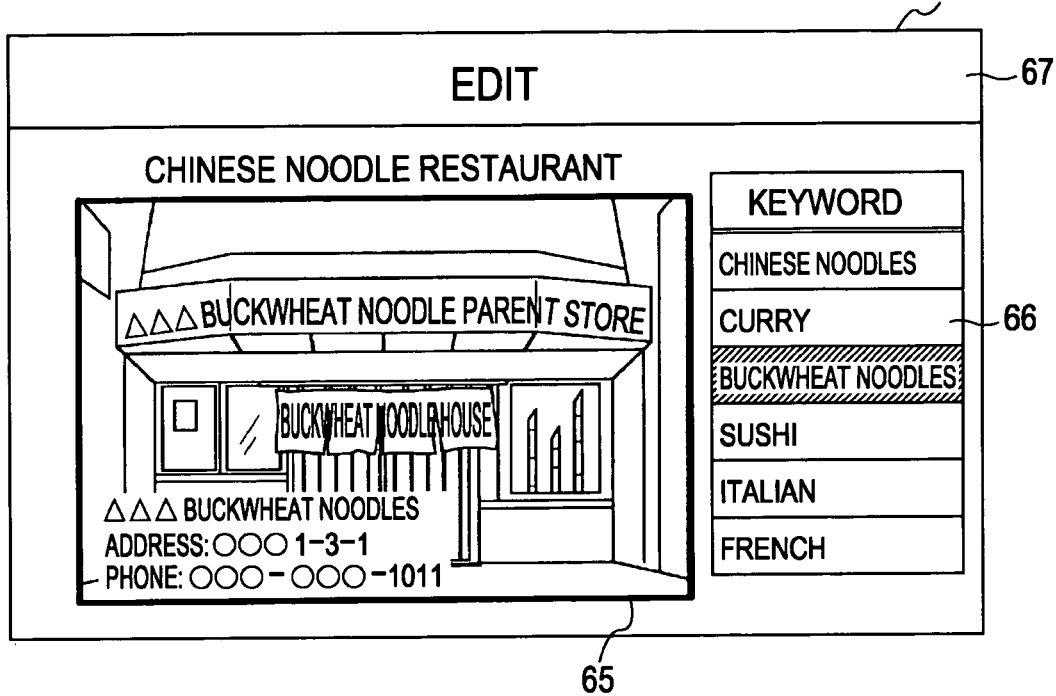
FIG. 11 is an explanatory diagram for inputting for editing.

In such a case, in step F107 or F312, the controller 11 controls the captured data processing unit 18, the OSD processing unit 28, and the image signal processing unit 15 to display a screen, for example, shown in FIG. 11 on the display apparatus 2. In other words, a file image 65 to be edited is displayed, and a message 67 for urging the user to edit and a keyword box 66 are also displayed. In the example shown in FIG. 11, image data of a buckwheat noodle restaurant and additional data indicating a "Chinese noodle restaurant" are displayed as the file image 65 to be edited.

This example shows a case where the user wants to correct additional data after mistakenly inputting "Chinese noodle restaurant" to the additional data.

The user selects "buckwheat noodles" from the keyword box 66, as shown in FIG. 11, while viewing the screen. The keyword selected as described above can be stored as new additional data Add#x corresponding to the image data CV#x in step F109 or F314 and updated and stored in step F310.

Although a keyword is selected from the keyword box 66 in the example shown in FIG. 11, the character input box 61 shown in FIG. 9A may be displayed when editing so as to urge the user to perform an editing operation as character input. In such a case, characters as already stored additional data can be displayed inside the keyword box 66 so that the user can change the character string.

Although cases where the user inputs additional data have been described, if user input and data extraction are performed as methods for generating additional data, as shown in the third example of the capturing process shown in FIG. 8, the user may select a method for generating additional data.

Figure 12:
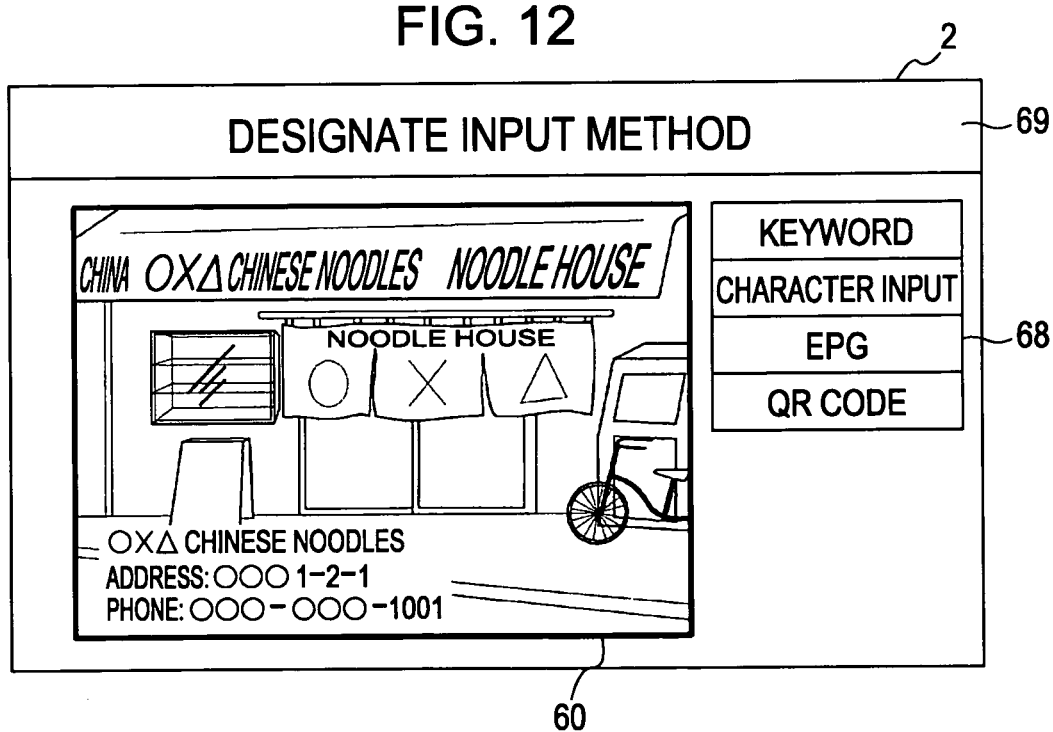
FIG. 12 is an explanatory diagram for selection of an input method.

For example, after the processing in step F305 or F311 shown in FIG. 8, the controller 11 displays a selection menu shown in FIG. 12 on the screen of the display apparatus 2, and presents to the user a message 69 for urging the user to designate an input method and a selection box 68. In this example, the user is able to select keyword inputting, character inputting, EPG data extraction, or QR code extraction.

When the user designates an input method, in response to the designation, the processing in step F308 or F312 is performed to generate additional data Add#x.

Processing until captured image data CV#x and additional data Add#x is stored in the data storage unit 19 has been described.

The image data CV#x and the additional data Add#x stored in the data storage unit 19 (hereinafter, generally referred to as a "captured file") is displayed on the screen of the display apparatus 2 in accordance with a user operation.

Figure 13:
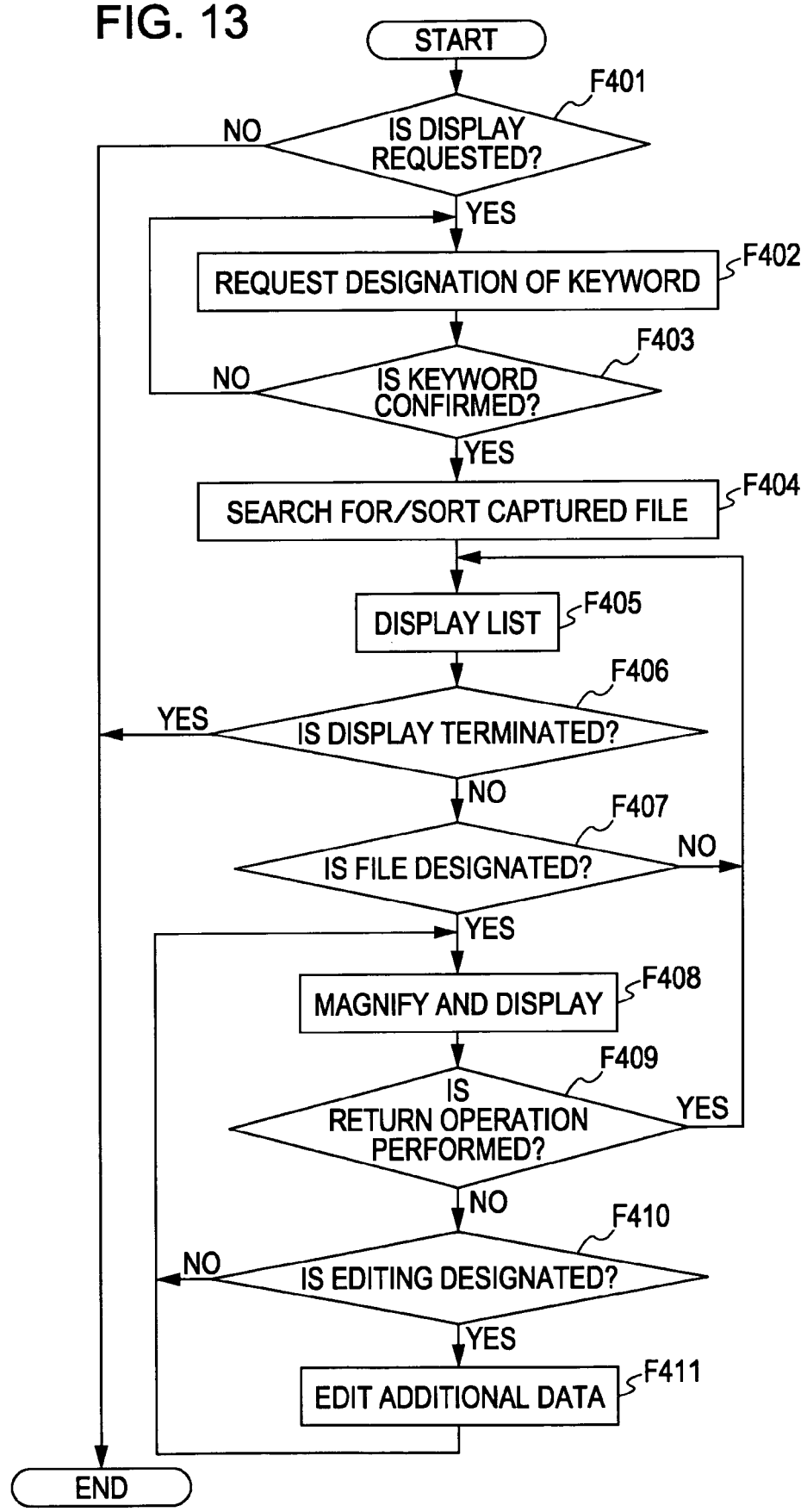
FIG. 13 is a flowchart of a process for displaying a captured file.

FIG. 13 shows an example of a process performed by the controller 11 when a captured file is displayed. Processing in steps F401 to F410 is performed under the control of the captured file display control function 33 shown in FIG. 2.

When detecting that the user performs an operation for requesting display of a captured file in step F401, the controller 11 proceeds to step F402. In step F402, the controller 11 controls the OSD processing unit 28 and the image signal processing unit 15 to perform display for requesting the user to perform an operation for designating a keyword. For example, a selection menu, such as a keyword box, is displayed on the screen of the display apparatus 2. Alternatively, the controller 11 may display a character input box to request the user to input a character string functioning as a keyword.

The controller 11 waits for selection or input of a keyword by the user. When the controller 11 detects an operation for confirming a keyword in step F403, the process proceeds to step F404.

In step F404, the controller 11 instructs the captured data processing unit 18 to perform searching processing or sorting processing on captured files based on the selected keyword from among captured files stored in the data storage unit 19. For example, as a search example when a keyword "Chinese noodles" is selected, captured files in which additional data Add#x includes a character string "noodles" are extracted.

In step F405, the controller 11 displays a list of the extracted captured files. In this case, the controller 11 causes the captured data processing unit 18 to generate image signals of a list screen including reduced images of the extracted captured files, and causes the OSD processing unit 28 to generate character images as keywords. These images are supplied to the image signal processing unit 15 and displayed on the display apparatus 2.

Sorting processing may be performed on captured files extracted by keyword searching in accordance with, for example, a stored date or the content of additional data, so that a list can be displayed in the sorted order.

Figure 14:
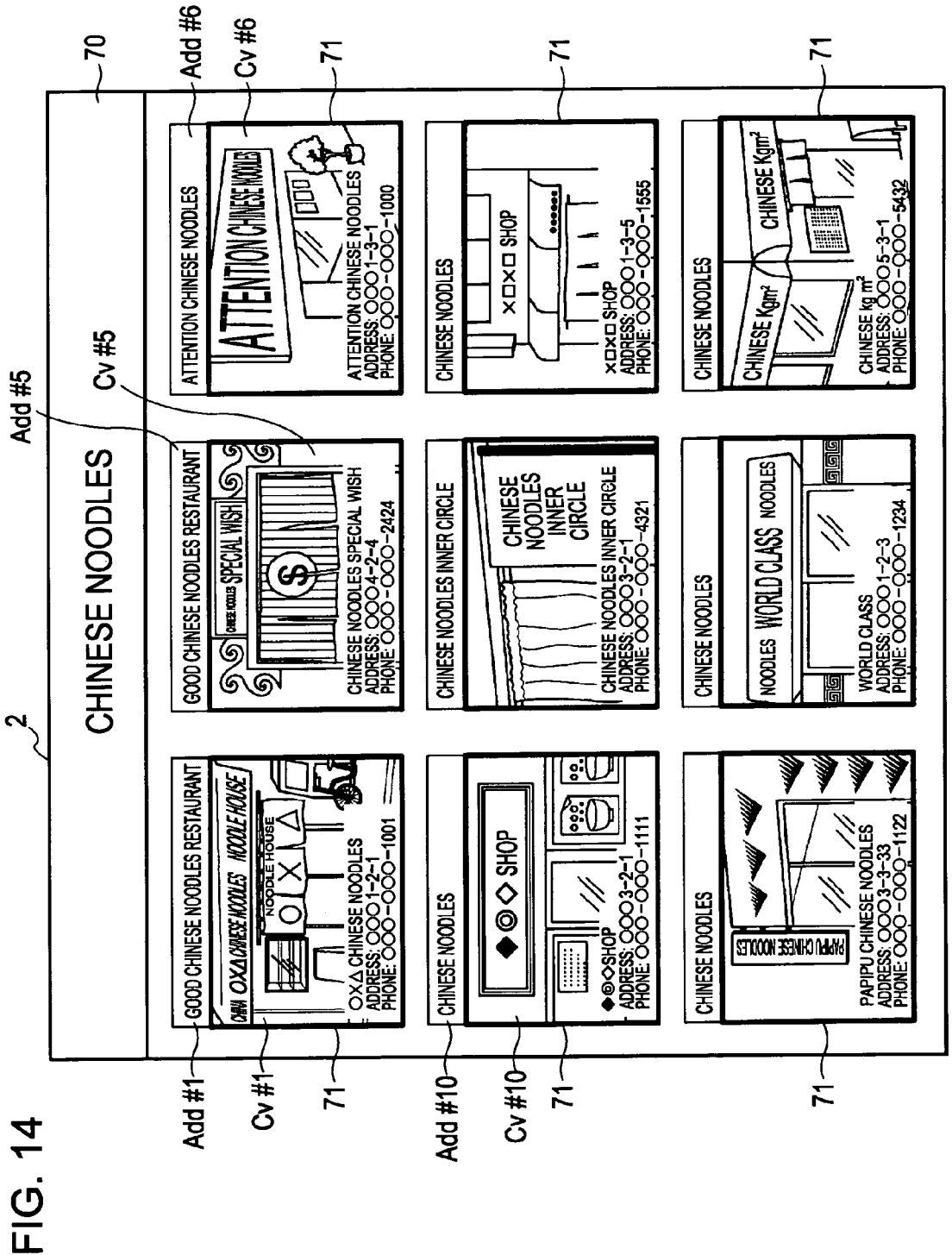
FIG. 14 is an explanatory diagram showing list display of captured files.

FIG. 14 shows an example of list display. A keyword 70 "Chinese noodles" selected by the user and a list of captured files 71 found by keyword searching are displayed on the screen of the display apparatus 2. Each of the captured files 71 includes image data CV#x and additional data Add#x.

In this case, since captured files extracted in accordance with the keyword "Chinese noodles" from among captured files stored in the data storage unit 19 are displayed, the additional data Add#x of each of the displayed captured files 71 includes the character string "Chinese noodles".

The user is able to confirm the contents of the stored captured files by viewing such a list.

Obviously, when many captured files 71 are found, the controller 11 is capable of changing captured files displayed on the list display screen in accordance with an operation, such as scrolling or page jump, so that each of the captured files 71 can be checked on the screen.

If the user performs a termination operation after the list is displayed, the controller 11 terminates list display in step F406, and terminates the process.

In contrast, the user is able to perform an operation for designating a captured file in the list. For example, the user selects a desired captured file 71 in the list by moving a cursor or the like.

Figure 15:
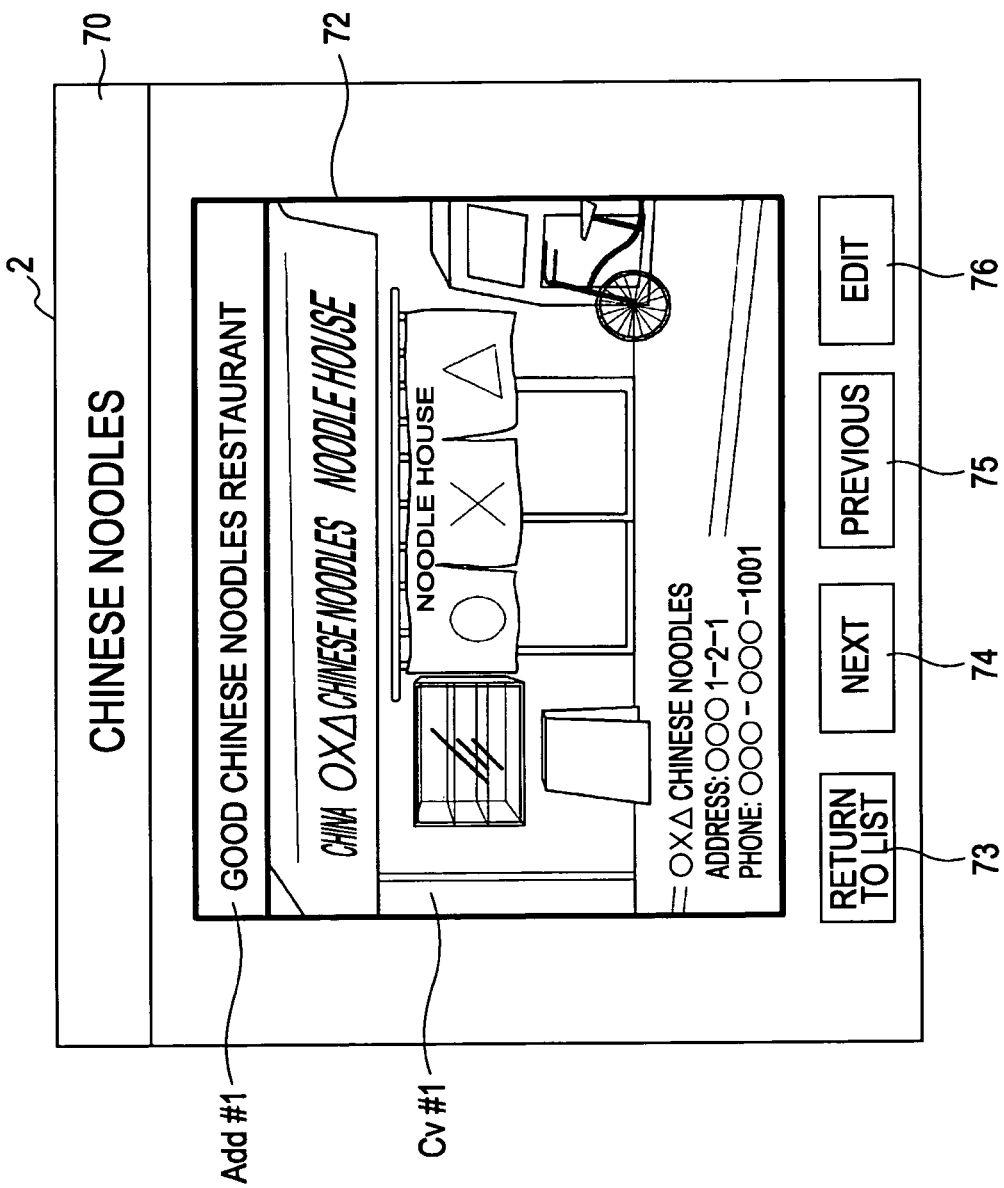
FIG. 15 is an explanatory diagram showing enlarged display of a captured file.

When the user designates a captured file by moving a cursor or the like and performs a confirmation operation in step F407, the controller 11 proceeds to step F408 to magnify and display the selected captured file 71. For example, in the example shown in FIG. 14, when the user selects the first captured file (a captured file 71 including image data CV#1 and additional data Add#1), the controller 11 magnifies and displays the selected captured file 71 on the screen of the display apparatus 2, as shown in FIG. 15. For example, an enlarged image 72 including the image data CV#1 and the additional data Add#1 is displayed together with the keyword 70.

The user is able to confirm information stored as a captured file in detail by viewing the enlarged image 72.

In the example shown in FIG. 15, an icon 73 used for returning to a list, icons 74 and 75 used for changing to the next and previous captured files, and an icon 76 used for editing are displayed together with the enlarged image 72.

For example, when the user selects the icon 73 in step F409, the controller 11 returns to step F405 to enter a state in which the display apparatus 2 displays the list, as shown in FIG. 14.

Although not shown in the flowchart in FIG. 13, when the user selects the icon 74 or 75 in FIG. 15, for example, a next or previous captured file from among captured files extracted for the list is magnified and displayed in the processing of step F408. For example, when the icon 74 is selected in a state in which the captured file 71 including the image data CV#1 and the additional data Add#1 is magnified and displayed, as shown in FIG. 15, image data CV#5 and additional data Add#5, which is the next captured file in the list shown in FIG. 14, is magnified and displayed.

When the icon 76 is operated in step F410 in the state shown in FIG. 15, the controller 11 proceeds to step F411 to edit the additional data Add#1 for the magnified and displayed captured file 71. Although the processing in step F411 is not described in detail here, for example, processing similar to that in steps F312, F313, F314, and F310 shown in FIG. 8 can be performed.

By the process shown in FIG. 13, the user is able to easily confirm information stored as a captured file in the data storage unit 19.

In other words, corresponding information (captured file) can be extracted in accordance with keyword selection, and the extracted captured file can be magnified and displayed so that the user is able to check the detail of the captured file. In addition, the user is able to edit additional data Add#x.

In other words, since necessary information is accumulated by storing a desired image as a captured file while viewing a stream image of a broadcast program or the like in accordance with a user operation for issuing a capturing instruction, as described above, the user is able to easily check the accumulated information by a list and enlarged display. For example, the user does not spend time and efforts for searching for a scene of information that the user wants to know while playing back a recorded program. In addition, since all the data of the entire information program or the like does not need to be stored if only necessary information is stored as a captured file in this embodiment, for example, the capacity of a recording medium, such as the HDD 16, can be efficiently used.

In addition, even if captured files are captured from different programs, the captured files can be displayed in a common list using a keyword as long as the files including the same type of information.

Although a captured file is extracted and searched for using a keyword in the example shown in FIG. 13, it is obvious that a list of all the captured files stored in the data storage unit 19 can be displayed without performing search or the like. For example, when the user does not designate a keyword or the like, a list of all the captured files may be displayed.

Alternatively, sorting processing may be performed instead of extraction and search. For example, when a keyword is input, a list of captured files may be displayed in the order of captured files that correspond to the keyword and captured files that do not correspond to the keyword. Alternatively, instead of using a keyword, captured files are sorted in the order of dates and times registered as captured files and displayed in that order on the list display screen.

Alternatively, after the list is displayed as shown in FIG. 14, various conditions for sorting and refinement can be input, and a list can be displayed by performing sorting and refinement in accordance with the input conditions.

In addition, only a list of additional data of captured files or only a list of image data of captured files may be displayed. In such a case, enlarged display shown in FIG. 15 can be displayed for a selected captured file in the list so that both the additional data and the image data can be checked.

In addition, a list is not necessarily displayed. Image data as captured files may be sequentially displayed one by one.

In addition, for example, a recording/playback unit for a portable recording medium, such as a memory card or a disk, may be provided in the video recorder 1 according to this embodiment so that captured files listed in a list and a captured file magnified and displayed can be recorded in the portable recording medium using the recording/playback unit.

Alternatively, an electronic mail transmission function, a local-area network (LAN) communication function, a universal serial bus (USB) interface function, and the like may be provided so that captured files listed in a list and a captured file magnified and displayed can be transmitted to an external apparatus.

Accordingly, the user is able to transfer information collected as captured files to cellular phones, personal digital assistants (PDAs), portable media players, and the like. Since the user is able to check information even in a place outside home, user-friendliness can be improved.

The embodiment has been described based on the structure of the video recorder 1 shown in FIG. 1. However, various hardware structures are possible in the present invention.

For example, a tuner apparatus (broadcast receiver) that does not have a recording/playback function, a television receiver containing a tuner, a playback apparatus that plays back optical discs, such as digital versatile discs (DVDs) or Blu-Ray Discs™, or other various media may be used instead of the video recorder 1.

In addition, operations described in the foregoing embodiment may be implemented in a network system.

For example, a remote commander functioning as an image processing apparatus according to another embodiment of the present invention for a network-connected apparatus will be described with reference to FIGS. 16 to 20.

Figure 16:
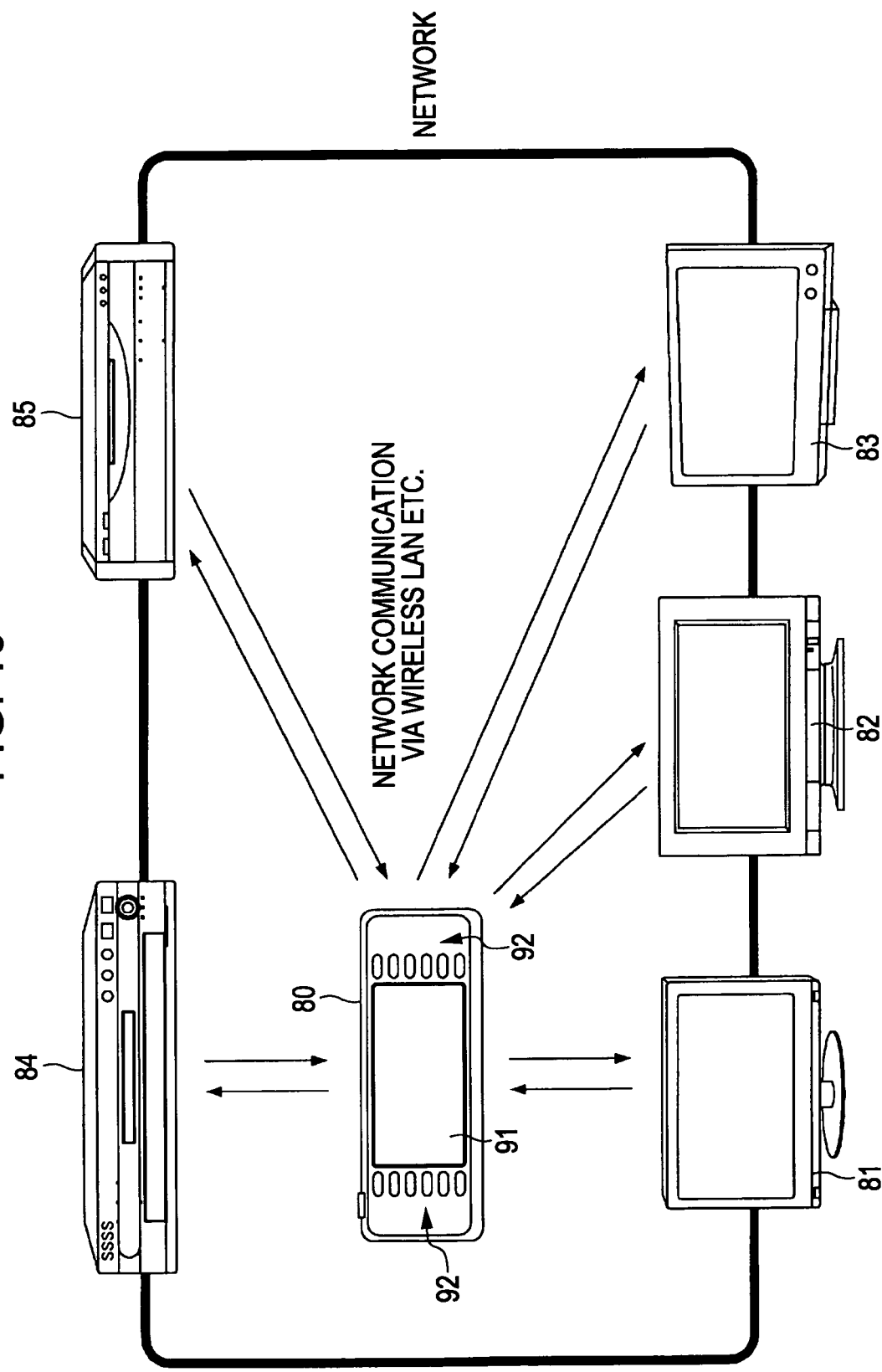
FIG. 16 is an explanatory diagram showing a network structure.

FIG. 16 shows an example in which a plurality of apparatuses is network-connected in homes, companies, communities, or the like. In this example, television receivers 81, 82, and 83 and video recorders (recording/playback apparatuses) 84 and 85 communicate with each other via a network. For example, apparatuses are installed in different rooms in a home and are capable of communicating with each other via wired or wireless network communication. Obviously, the apparatuses may be placed in remote places.

Each of the apparatuses is capable of being operated using an Internet protocol (IP) remote commander (hereinafter, referred to as an IP remote controller) 80. The IP remote controller 80 is capable of transmitting and receiving data, such as command signals and image data, to and from each of the apparatuses via network communication, such as a wireless LAN.

The IP remote controller 80 is formed by a compact and lightweight casing that can be carried by the user. The IP remote controller 80 includes a display unit 91, such as a liquid crystal panel, and an operation key section 92 including various operation keys. The user is able to perform an operation and view an image using the IP remote controller 80.

Figure 17:
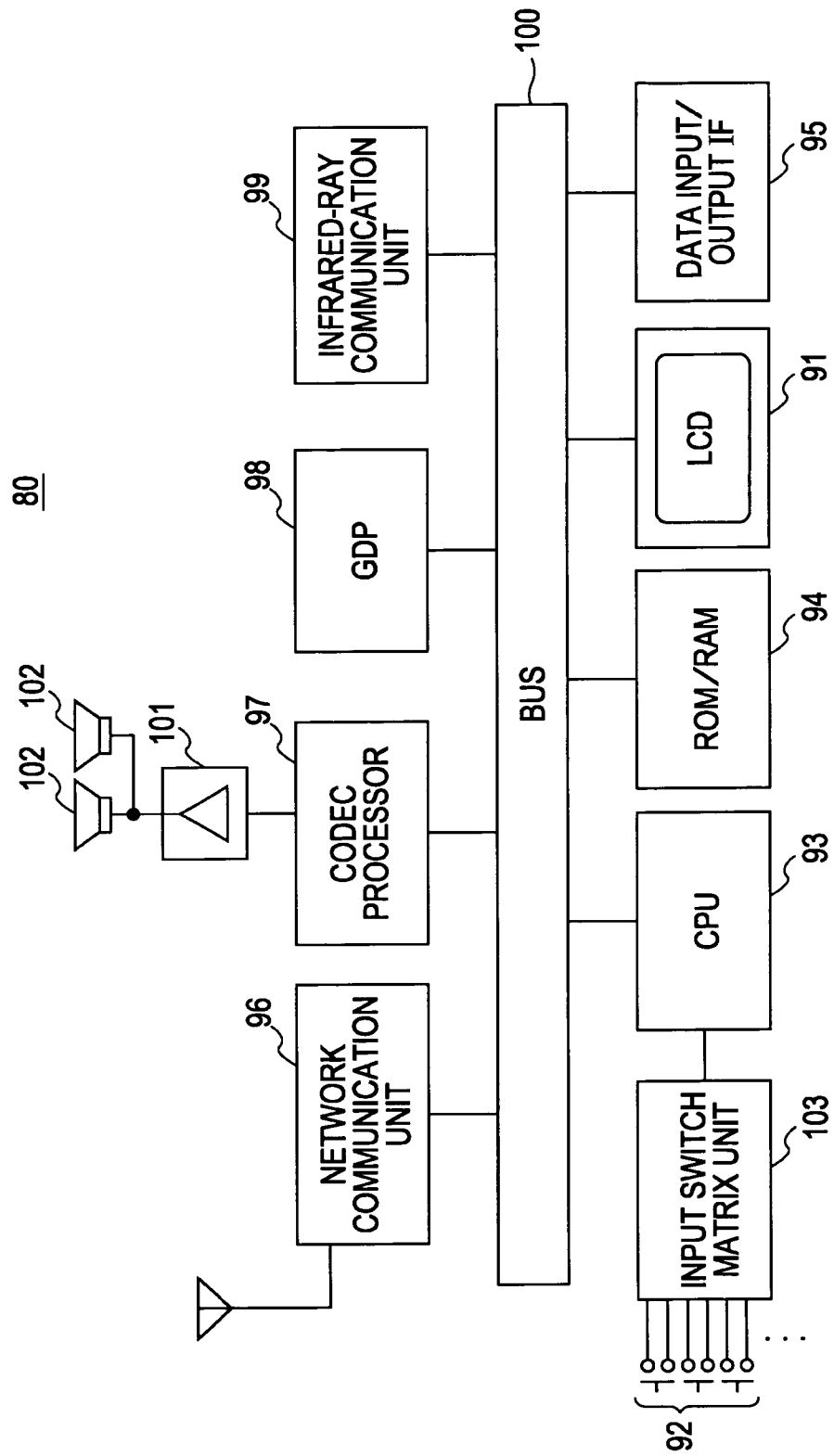
FIG. 17 is a block diagram showing an IP remote controller.

FIG. 17 shows the internal structure of the IP remote controller 80. Units of the IP remote controller 80 shown in FIG. 17 exchange data and control signals via a bus 100.

A CPU 93 performs arithmetic processing necessary for operations of the units of the IP remote controller 80 and controls the units. The CPU 93 performs necessary control in accordance with operation information using the operation key section 92 detected by an input switch matrix unit 103.

A ROM/RAM 94 is used for storing operation programs of the CPU 93 and for storing various types of command information output from the remote commander. The ROM/RAM 94 is also used as a work area for arithmetic processing and a buffer area for received data. In this embodiment, the ROM/RAM 94 is used for storing captured files.

Various memory areas are generally shown as the ROM/RAM 94. The ROM/RAM 94 includes, for example, a ROM, a D-RAM, an S-RAM, and a nonvolatile memory.

A network communication unit 96 performs data communication with, for example, the apparatuses on the network shown in FIG. 16.

A data input/output interface 95 performs interface processing for communication with, for example, an external apparatus by the network communication unit 96. For example, the data input/output interface 95 performs predetermined communication format processing for control signals and data to be transmitted from the CPU 93, and transfers the control signals and data to the network communication unit 96 via the bus 100. In addition, the data input/output interface 95 performs input processing of various data received by the network communication unit 96, and transfers the various data to desired portions (the CPU 93, the ROM/RAM 94, a codec processor 97, a graphic display processor (GDP) 98, and the like) via the bus 100.

The codec processor 97 performs decoding processing, digital audio processing, and D/A conversion for audio data to be output. The codec processor 97 supplies an analog audio signal to an amplifier 101 and causes sound to be output via a speaker 102.

The GDP 98 performs processing for image data to be output, drawing processing of various images, and the like. Image data processed or generated by the GDP 98 is supplied to a display unit 91, and an image is displayed and output.

An infrared-ray communication unit 99 outputs an operation command signal to an external apparatus using an infrared-ray signal.

Figure 18:
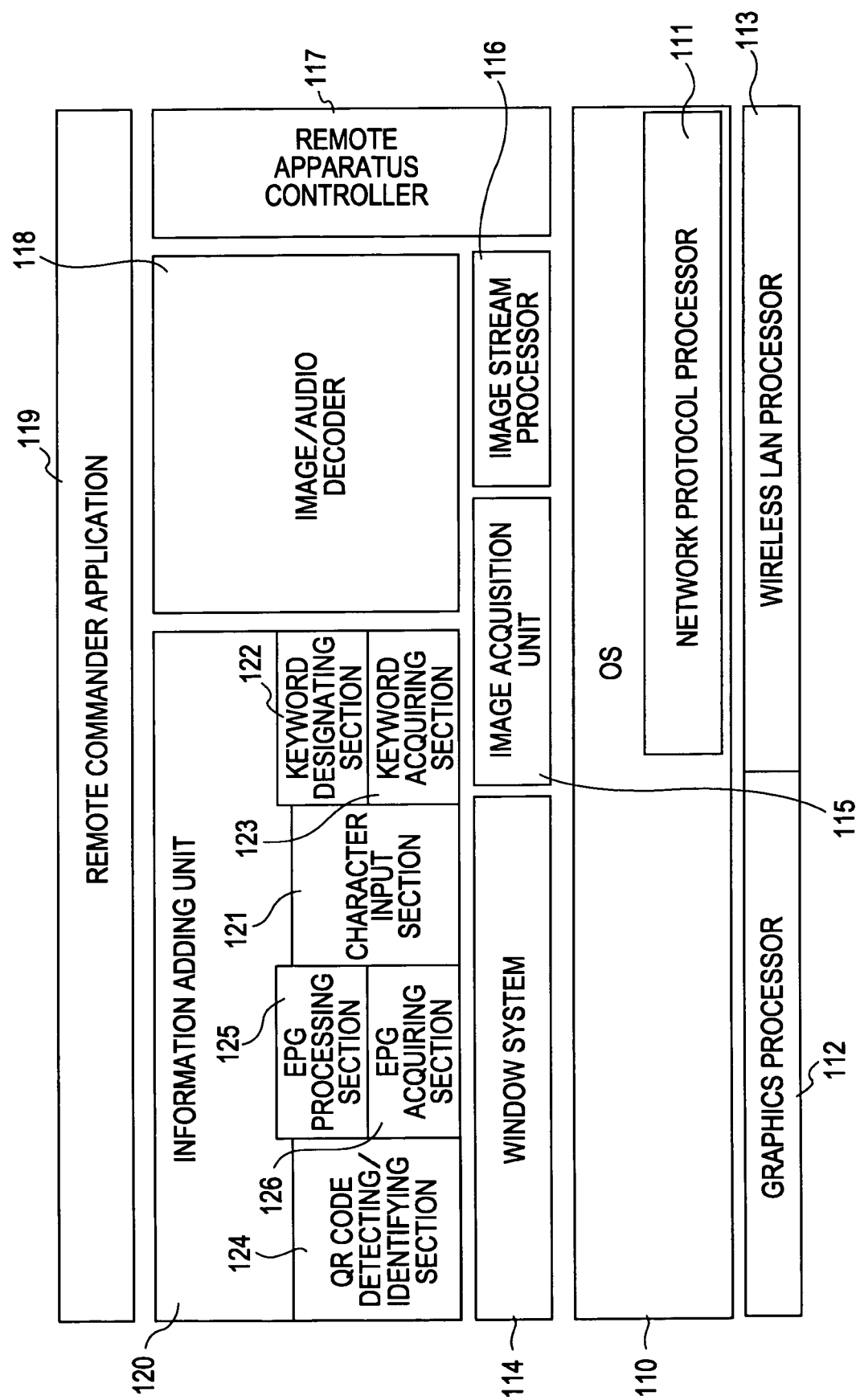
FIG. 18 is an explanatory diagram showing a software structure of the IP remote controller.

FIG. 18 shows the structure of software functioning in the CPU 93.

Referring to FIG. 18, as software functions, an operating system (OS) 110, a network protocol processor 111, a graphics processor 112, a wireless LAN processor 113, a window system 114, an image acquisition unit 115, an image stream processor 116, a remote apparatus controller 117, an image/audio decoder 118, a remote commander application 119, and an information adding unit 120 are provided.

The graphics processor 112 and the window system 114 that function on the basic processing by the OS 110 control the display operation of the display unit 91.

In addition, the network protocol processor 111 and the wireless LAN processor 113 control operations of the network communication unit 96 and the data input/output interface 95.

In addition, the image stream processor 116 and the image/audio decoder 118 control processing for image data and audio data output from the display unit 91 and the speaker 102.

The remote apparatus controller 117 controls an operation for transmitting control information to an external apparatus via network communication.

The remote commander application 119 controls an operation for outputting an infrared-ray command signal.

As a characteristic operation of the IP remote controller 80 in this embodiment, the image acquisition unit 115 controls image capturing.

In addition, the information adding unit 120 performs processing for additional data to be added to a captured image.

The information adding unit 120 includes a character input section 121, a keyword designating section 122, a keyword acquiring section 123, a QR code detecting/identifying section 124, an EPG processing section 125, and an EPG acquiring section 126.

The character input section 121 performs processing when the user inputs characters for additional data.

The keyword designating section 122 performs processing when the user inputs additional data by selecting a keyword.

The keyword acquiring section 123 performs processing when a candidate character string functioning as a keyword is generated. For example, the keyword acquiring section 123 extracts a keyword from EPG data or a QR code.

The QR code detecting/identifying section 124 detects a QR code and extracts the content of recorded data when the QR code is included in captured image data.

The EPG acquiring section 126 acquires EPG data. For example, the EPG acquiring section 126 acquires EPG data from an external apparatus via, for example, network communication.

The EPG processing section 125 identifies and selects the content of acquired EPG data.

For example, the IP remote controller 80 having the above-described structure is capable of performing various operations for the network shown in FIG. 16, as described below.

The IP remote controller 80 is capable of performing operations as a normal remote commander that outputs infrared-ray command signals to the television receivers 81, 82, and 83 and the video recorders 84 and 85.

The IP remote controller 80 is capable of performing an operation for supplying control signals to the television receivers 81, 82, and 83 and the video recorders 84 and 85 and requesting predetermined operations via network communication as a wireless LAN. For example, the IP remote controller 80 is capable of controlling an operation of each apparatus (including turning on/off, recording, playback, reception channel setting, and the like) and issuing instructions for relative operations. For example, the IP remote controller 80 is capable of issuing instructions for an operation for causing the video recorder 84 to play back image content and causing the television receiver 82 to display the image content, or an operation for causing the video recorder 85 to record a broadcast image received and demodulated by the television receiver 83.

The IP remote controller 80 is capable of causing an image signal or audio signal received or played back by the television receiver 81, 82, or 83 or the video recorder 84 or 85 to be transmitted to the IP remote controller 80 and causing the display unit 91 or the speaker 102 of the IP remote controller 80 to output an image or sound.

The IP remote controller 80 is capable of causing the television receiver 81, 82, or 83 or the video recorder 84 or 85 to display or record an image displayed on the IP remote controller 80.

In addition to the normal operations of the IP remote controller 80, in this embodiment, operations similar to the operations for image capturing described in the foregoing embodiment can be performed.

Figure 19:
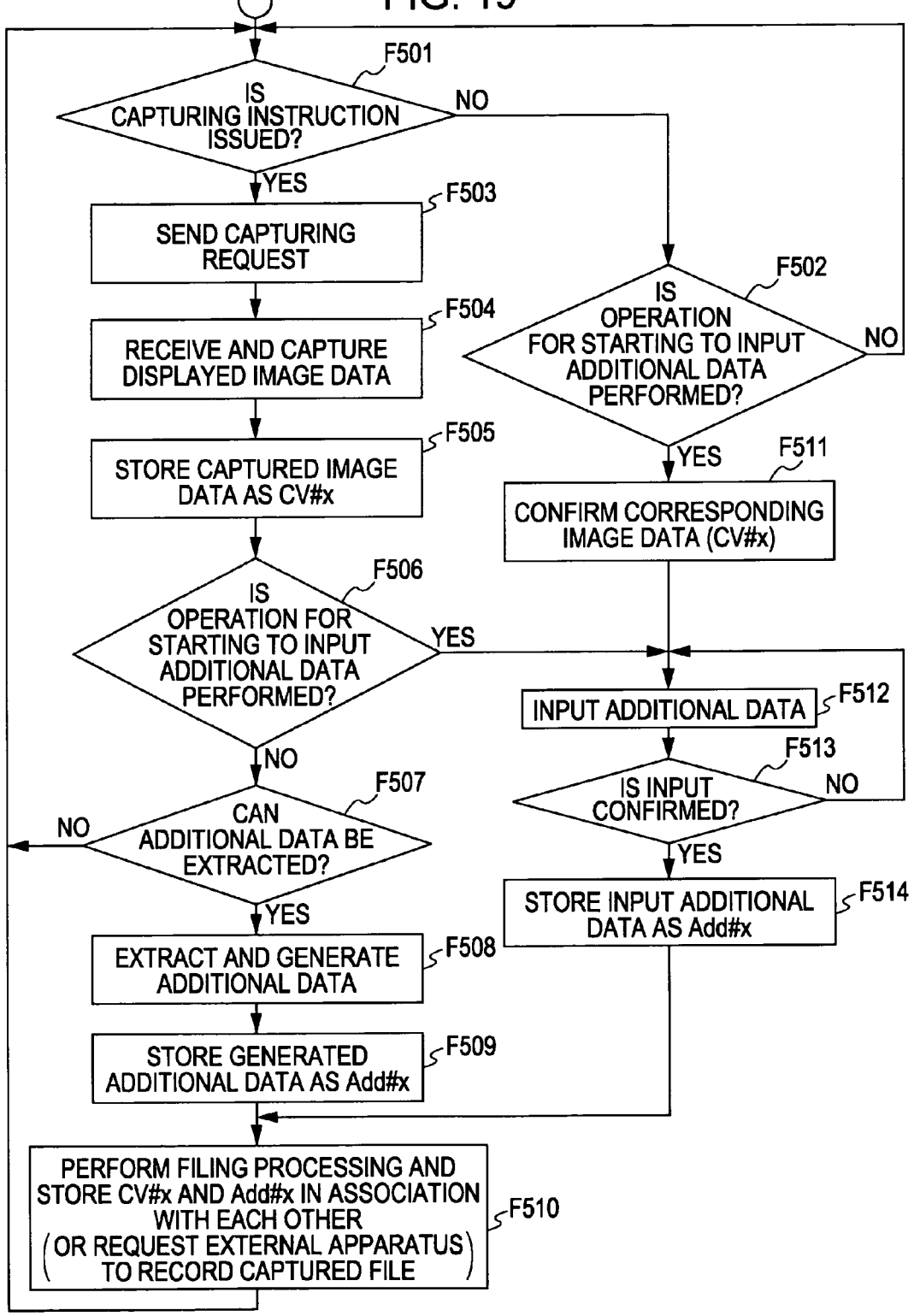
FIG. 19 is a flowchart of a capturing process performed by the IP remote controller.

FIG. 19 shows an example of the process performed by the CPU 93 of the IP remote controller 80 when the IP remote controller 80 captures a broadcast image or a playback image. The IP remote controller 80 is capable of performing various processing examples, as in the case where the video recorder 1 is used, as described above with reference to FIGS. 6, 7, and 8. Although other modifications are also available, a case where a process similar to the third example of the capturing process shown in FIG. 8 is performed by the IP remote controller 80 is described with reference to FIG. 19.

On the network shown in FIG. 16, the television receivers 81, 82, and 83 are capable of outputting images played back by the video recorder 84 or 85 as well as images of received broadcast programs. An example in which the IP remote controller 80 performs image capturing when the user is viewing a broadcast image or a playback image on the television receiver 81 will now be described.

FIG. 19 shows an example of the process performed by the CPU 93 when the user performs an operation for image capturing using the IP remote controller 80.

In step F501, the CPU 93 monitors whether or not the user performs an operation for issuing a capturing instruction. In step F502, the CPU 93 monitors whether or not the user performs an operation for starting to input additional data.

While viewing a program on the television receiver 81, the user is able to perform an operation for issuing a capturing instruction using the operation key section 92 of the IP remote controller 80 when an image that the user wants to capture is being displayed.

When it is detected in step F501 that the user performs an operation for issuing a capturing instruction, the CPU 93 proceeds to step F503.

In step F503, the CPU 93 requests the television receiver 81 to capture an image. Although the request can be transmitted from the network communication unit 96, the request may be transmitted as an infrared-ray signal via the infrared-ray communication unit 99. If a plurality of television receivers is network-connected, as in the example shown in FIG. 16, the IP remote controller 80 specifies an apparatus to which the capturing request is to be transmitted. When the user designates an apparatus to be operated using the IP remote controller 80, the apparatus can be specified as a transmission destination. For example, when the user performs an operation for instructing the television receiver 81 to receive a broadcast or an operation for instructing the video recorder 84 to play back an image and instructing the television receiver 81 to display and output the image, it is determined that the capturing instruction is issued for the image displayed on the television receiver 81. Thus, the CPU 93 specifies the television receiver 81 as a transmission designation of the capturing request.

In response to the capturing request from the IP remote controller 80, for example, the television receiver 81 performs an operation for transmitting to the IP remote controller 80 a frame of image data of an image signal being displayed at that point in time. The IP remote controller 80 receives the image data via the network communication unit 96. In step F504, the CPU 93 captures the received image data. In step F505, the CPU 93 stores the captured image data as image data CV#x. For example, the CPU 93 stores into the ROM/RAM 94 the captured image data as image data CV#x that is associated with no additional data.

The television receiver 81 can transmit to the IP remote controller 80 a frame of captured image data after compression. However, the television receiver 81 may transmit the frame of captured image data to the IP remote controller 80 without compression, and the IP remote controller 80 may compress the received image data and store the compressed image data into the ROM/RAM 94.

In addition, in step F505, the CPU 93 displays the image data CV#x on the display unit 91. Display for urging the user to input additional data can be performed at the same time.

Figure 20:
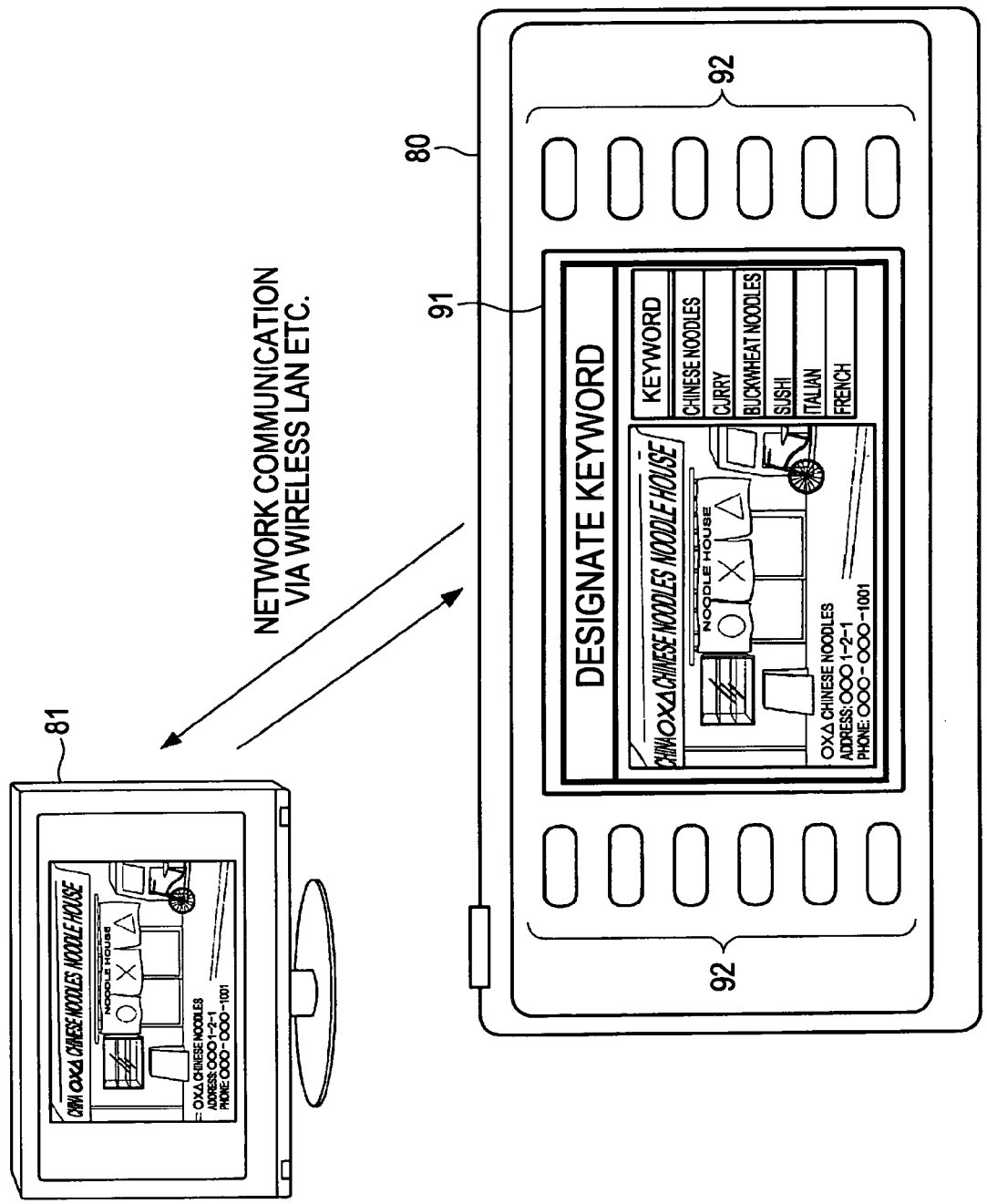
FIG. 20 is an explanatory diagram showing an example of display when the IP remote controller performs capturing.

FIG. 20 shows a case where the processing in steps F503, F504, and F505 is performed. The IP remote controller 80 transmits a capturing request to the television receiver 81, and the television receiver 81 transmits to the IP remote controller 80 image data being displayed at that point in time. The IP remote controller 80 stores the received image data, and displays the captured image 60 on the display unit 91, as shown in FIG. 20. For example, the message 64 and the keyword box 63 are also displayed on the display unit 91 so as to urge the user to input additional data. Obviously, the character input box 61 may be displayed, as shown in FIG. 9.

In step F506, the CPU 93 monitors whether or not the user starts an operation for inputting additional data immediately after the capturing instruction is issued. For example, the CPU 93 monitors whether or not the user performs an operation for designating a keyword on the screen shown in FIG. 20.

When it is determined in step F506 that the user does not perform an operation for starting to input additional data immediately after the capturing instruction is issued, the process proceeds to step F507. In step F507, the CPU 93 determines whether or not information to be used as additional data can be extracted. For example, the CPU 93 determines whether or not a QR code is added to the captured image data CV#x and whether or not effective information to be used as additional data can be decoded.

If information, such as text data, necessary for generating additional data is acquired from the QR code, the CPU 93 determines in step F507 that additional data can be extracted, and the process proceeds to step F508. In step F508, the CPU 93 generates additional data based on information acquired by decoding the QR code.

In step F509, the CPU 93 stores the generated additional data as additional data Add#x corresponding to the captured image data CV#x.

In step F510, filing processing in which the image data CV#x and the additional data Add#x is associated with each other is performed, and the image data CV#x and the additional data Add#x is stored, for example, in the file format shown in FIG. 3A or 3B into the ROM/RAM 94.

Then, the process returns to the operation monitoring processing in steps F501 and F502.

Instead of storing the captured file into the ROM/RAM 94, the captured file may be stored into an external storage apparatus.

For example, in step F510, the CPU 93 transmits to the video recorder 84 a recording request and the image data CV#x and the additional data that is subjected to filing processing. In response to this, the video recorder 84 stores the captured file into a recording medium inside the video recorder 84. Obviously, the captured file is not necessarily recorded in the video recorder 84. The captured file may be recorded in another apparatus that is capable of recording a file.

If the IP remote controller 80 includes a card slot and a memory card can be inserted into the card slot, the captured file may be recorded on the memory card.

If it is determined in step F507 that additional data cannot be extracted, the CPU 93 returns to the operation monitoring processing in steps F501 and F502. In other words, in this case, additional data for the captured image data CV#x is generated based on data input later by the user.

If it is determined in step F506 that the user performs an operation for inputting additional data, for example, an operation for designating a keyword on the screen shown in FIG. 20, immediately after the capturing instruction is issued, the CPU 93 proceeds to step F512. In step F512, additional data input processing corresponding to a user operation is performed. Various methods for inputting additional data are possible, as described above.

If the input content is confirmed by a user operation in step F513, the process proceeds to step F514. In step F514, additional data is generated in accordance with the set input data, and generated additional data is stored as additional data Add#x corresponding to the captured image data CV#x.

Then, in step F510, filing processing in which the image data CV#x and the additional data Add#x is associated with each other is performed, and the image data CV#x and the additional data Add#x is stored, for example, in the file format shown in FIG. 3A or 3B into the ROM/RAM 94 or an external apparatus capable of recording.

When it is determined in step F502 that the user performs an operation for starting to input additional data, for example, an operation for setting the additional data input mode is detected, the CPU 93 proceeds to step F511. In other words, this is a case where the user intends to input additional data for image data CV#x that has already been captured and that is not stored as a file in association with additional data. Alternatively, this is a case where the user wants to perform editing, such as correction of additional data, in a captured file in which the image data CV#x is associated with the additional data. In step F511, image data CV#x for which additional data is to be input is specified in accordance with a user designation.

Then, in processing of step F512, F513, F514, and F510, additional data is input or edited, filing processing is performed, and recording of a captured file is performed.

If a captured file is stored in an external storage apparatus, such as the video recorder 84, in order to edit the captured file that is already stored in the external apparatus, the processing in steps F511, F512, F513, F514, and F510 can be performed while communicating with the external apparatus.

As described above, capturing processing using the IP remote controller 80 is performed.

The process shown in FIG. 19 is merely an example. A process for generating additional data by a user input, as shown in FIG. 6, and a process for automatically generating additional data from a QR code, EPG data, or the like, as shown in FIG. 7 are possible. In addition, when additional data is input, the user may select an input method, as shown in FIG. 12. In other words, various modifications are available as in the embodiment described with reference to FIGS. 1 to 15.

In addition, although image data is captured into the IP remote controller 80 in accordance with an operation for an issuing a capturing instruction while the user is viewing a stream image on the television receiver 81 in the above example, a stream image received by the television receiver 81, 82, or 83 or a stream image played back by the video recorder 84 or 85 may be supplied to the IP remote controller 80 via network communication, and the stream image may be viewed on the display unit 91 of the IP remote controller 80. In such a case, capturing processing is performed inside the remote controller 80 for the stream image being displayed.

A captured file captured and stored as described above by the IP remote controller 80 can be displayed in accordance with a user operation by processing performed by the CPU 93 similar to the processing shown in FIG. 13.

In other words, when the user performs an operation for requesting display of a captured file using the operation key section 92, the CPU 93 can perform the processing of steps F402, F403, F404, and F405 shown in FIG. 13 to search for captured files stored in the ROM/RAM 94 and to display a list on the display unit 91. In addition, the CPU 93 can perform the processing in steps F406 to F411 to perform enlarged display and editing.

In a case where a card slot is provided in the IP remote controller 80 and a captured file is stored in a memory card, similar processing can be performed.

However, if the IP remote controller 80 stores captured files into an external apparatus capable of recording data, such as the video recorder 84 or 85, the CPU 93 requests the external apparatus to display a list of captured files, to enlarge and display a captured file, and to edit the captured file.

As described above, the IP remote controller 80 for a network apparatus is capable of image capturing and list display of captured files. Thus, advantages similar to those in the embodiment described with reference to FIGS. 1 to 15 can be achieved.

In addition, when a portable apparatus, such as the IP remote controller 80, is used, if the user carries the IP remote controller 80 with him or her, the user is able to carry stored captured files with him or her. Thus, for example, the user may be able to look for a Chinese noodle restaurant while carrying information on the Chinese noodle restaurant with him or her. Thus, user-friendliness can be further improved.

Although the operations of the IP remote controller 80 have been described, cellular phones or PDAs may perform the above-described operations. In such a case, portability of captured files can be achieved.

Although the IP remote controller 80 performs wireless LAN communication with the television receivers 81, 82, and 83 and the video recorders 84 and 85 in the network structure shown in FIG. 16, a network structure shown in FIG. 21 is also possible.

Referring to FIG. 21, the television receivers 81, 82, and 83 and the video recorders 84 and 85 are capable of communicating with each other via a wired LAN, and an access point 150 for the wireless LAN is provided on the wired LAN. The IP remote controller 80 accesses the wired LAN network via the access point 150. In other words, the structure in which the IP remote controller 80 controls each apparatus on the network by communication via the access point 150 and performs data transmission and reception is provided.

In such a network structure, the above-described operations can also be performed.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an image data capturing unit to capture a frame of stream image data displayed on a display device in accordance with an input capturing instruction, said image data capturing unit including a frame memory to store a number of frames of the image data displayed on said display device for a predetermined amount of time so as to enable image data capturing with no time lag;
    additional data generating means for generating additional data to be associated with the image data captured by the image data capturing means; and
    storage control means for storing into a predetermined storage unit the image data captured by the image data capturing means and the additional data generated by the additional data generating means in association with each other,
    generating additional data comprises selecting automatically between generating the additional data based on data extracted from the stream image data and generating the additional data based on data input by the user,
    when the additional data is generated based on data input by the user, the captured frame and a keyword group including a plurality of selectable keywords are displayed on a screen of a remote control device, and when the user uses the remote control device to select a keyword within the group, the keyword is designated as additional data.

2. The image processing apparatus according to claim 1, further comprising list display control means for generating list image data of image data stored in the storage unit by the storage control means and for outputting the list image data to the display device.

3. The image processing apparatus according to claim 2, wherein the list display control means searches for or sorts the image data stored in the storage unit in accordance with the additional data, and generates the list image data in accordance with a result of searching or sorting.

4. The image processing apparatus according to claim 1, further comprising operation input means used for a user operation, wherein
    the additional data generating means generates the additional data using data input by an operation of the operation input means.

5. The image processing apparatus according to claim 4, wherein the data input by the operation of the operation input means is character data.

6. The image processing apparatus according to claim 1, further comprising operation input means used for a user operation, wherein
the additional data generating means generates the additional data using data selected by an operation of the operation input means.

7. The image processing apparatus according to claim 6, wherein the additional data generating means generates selection candidate data and generates the additional data using the data selected from the selection candidate data by the operation of the operation input means.

8. The image processing apparatus according to claim 1, further comprising data acquiring means for acquiring data relating to the image data captured by the image data capturing means, wherein
the additional data generating means generates the additional data using the data acquired by the data acquiring means.

9. An image processing method comprising the steps of:
capturing a frame of stream image data displayed on a display device in accordance with an input capturing instruction;
generating additional data to be associated with the image data captured by the image data capturing step; and
storing into a predetermined storage unit the image data captured by the image data capturing step and the additional data generated by the additional data generating step in association with each other,
said capturing including storing in a frame memory a number of frames of the image data displayed on said display device for a predetermined amount of time so as to enable image data capturing with no time lag,
generating additional data comprises selecting automatically between generating the additional data based on data extracted from the stream image data and generating the additional data based on data input by the user,
when the additional data is generated based on data input by the user, the captured frame and a keyword group including a plurality of selectable keywords are displayed on a screen of a remote control device, and when the user uses the remote control device to select a keyword within the group, the keyword is designated as additional data.

10. The image processing method according to claim 9, further comprising the step of generating list image data of image data stored in the storage unit by the storing step and outputting the list image data to the display device.

11. The image processing method according to claim 10, wherein, in the step of generating and outputting the list image data, searching or sorting is performed on the image data stored in the storage unit in accordance with the additional data, and the list image data is generated in accordance with a result of the searching or the sorting.

12. The image processing method according to claim 9, wherein, in the additional data generating step, the additional data is generated using data input by a user operation.

13. The image processing method according to claim 12, wherein the data input by the user operation is character data.

14. The image processing method according to claim 9, wherein, in the additional data generating step, the additional data is generated using data selected by a user operation.

15. The image processing method according to claim 14, wherein, in the additional data generating step, selection candidate data is generated, and the additional data is generated using the data selected from the selection candidate data by the user operation.

16. The image processing method according to claim 9, further comprising the step of acquiring data relating to the image data captured by the image data capturing step, wherein
in the additional data generating step, the additional data is generated using the data acquired by the data acquiring step.

17. An image processing apparatus comprising:
an image data capturing section that captures a frame of stream image data displayed on a display device in accordance with an input capturing instruction, said image data capturing section including a frame memory to store a number of frames of the image data displayed on said display device for a predetermined amount of time so as to enable image data capturing with no time lag;
an additional data generator that generates additional data to be associated with the image data captured by the image data capturing section; and
a storage controller that stores into a predetermined storage unit the image data captured by the image data capturing section and the additional data generated by the additional data generator in association with each other,
generating additional data comprises selecting automatically between generating the additional data based on data extracted from the stream image data and generating the additional data based on data input by the user,
when the additional data is generated based on data input by the user, the captured frame and a keyword group including a plurality of selectable keywords are displayed on a screen of a remote control device, and when the user uses the remote control device to select a keyword within the group, the keyword is designated as additional data.

* * * * *